United States Patent
Polimeni et al.

(10) Patent No.: US 12,486,070 B2
(45) Date of Patent: Dec. 2, 2025

(54) LIQUID CONTAINER AND CAP

(71) Applicant: The Procter & Gamble Company, Cincinnati, OH (US)

(72) Inventors: Victoria Ann Polimeni, Cincinnati, OH (US); Mauro Alvarado, Jr., Cincinnati, OH (US); Kerry Lloyd Weaver, Florence, KY (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 18/809,386

(22) Filed: Aug. 20, 2024

(65) Prior Publication Data
US 2025/0066061 A1  Feb. 27, 2025

Related U.S. Application Data

(60) Provisional application No. 63/520,941, filed on Aug. 22, 2023.

(51) Int. Cl.
*B65D 1/40* (2006.01)
*B65D 1/02* (2006.01)
(Continued)

(52) U.S. Cl.
CPC ............. *B65D 1/40* (2013.01); *B65D 1/0246* (2013.01); *B65D 1/0276* (2013.01);
(Continued)

(58) Field of Classification Search
CPC ...... B65D 1/40; B65D 1/0246; B65D 1/0276; B65D 23/102; B65D 41/04; B65D 47/0804
(Continued)

(56) References Cited

U.S. PATENT DOCUMENTS 6,367,670 B1   4/2002   Warner et al.
2011/0278190 A1*  11/2011   Horton ............... G06Q 10/00
                                              206/459.5
(Continued)

FOREIGN PATENT DOCUMENTS

WO    2021067263 A1    4/2021

OTHER PUBLICATIONS

EPO Search Report and Opinion for 24195421.3 dated Feb. 5, 2025, 9 pages.
(Continued)

*Primary Examiner* — Jacob K Ackun
(74) *Attorney, Agent, or Firm* — Kathleen Y. Carter; George H. Leal

(57) ABSTRACT

A container having a liquid composition therein is described. The container has a body portion; a neck disposed on the body portion, the neck having a neck opening; a first longitudinal side edge and an opposing second longitudinal side edge defining a container width therebetween; a cap positioned on the neck. The cap has a cap plate having an elongated opening having a width of from about 10 mm to about 35 mm. The elongated opening has a front edge and an opposing a back edge. The back edge is spaced from the second longitudinal side edge by less than about 45 percent of the container width. The liquid composition has a viscosity of from about 1 mPa·s to about 10,000 mPa·s.

20 Claims, 11 Drawing Sheets

(51) Int. Cl.
*B65D 23/10* (2006.01)
*B65D 41/04* (2006.01)
*B65D 47/08* (2006.01)

(52) U.S. Cl.
CPC .......... *B65D 23/102* (2013.01); *B65D 41/04* (2013.01); *B65D 47/0804* (2013.01)

(58) Field of Classification Search
USPC ................ 206/524.1, 524.6, 525; 220/259.1
See application file for complete search history.

(56) References Cited

U.S. PATENT DOCUMENTS

| | | | | |
|---|---|---|---|---|
| 2015/0027913 | A1* | 1/2015 | P. J. ................... | B65D 81/3211 |
| | | | | 53/428 |
| 2015/0166239 | A1* | 6/2015 | Dabah ................... | B65D 51/28 |
| | | | | 206/222 |
| 2015/0367614 | A1* | 12/2015 | Sasaki ................... | B32B 27/32 |
| | | | | 428/522 |
| 2016/0039557 | A1* | 2/2016 | Akutsu ................... | B29C 49/08 |
| | | | | 206/524.6 |

OTHER PUBLICATIONS

Xie Jun "A Comprehensive Guide to Liquid Detergent Viscosity: Understanding the Importance, Factors, and Applications", Retrieved from Internet: https://yeserchem.com/a-comprehensive-guide-to-liquiddetergent-viscosity-understanding-the-importance-factors-andapplications/#a-ideal-viscosity-values-for-various-liquid-detergents, XP093239827, Jun. 16, 2023, 1 page.

* cited by examiner

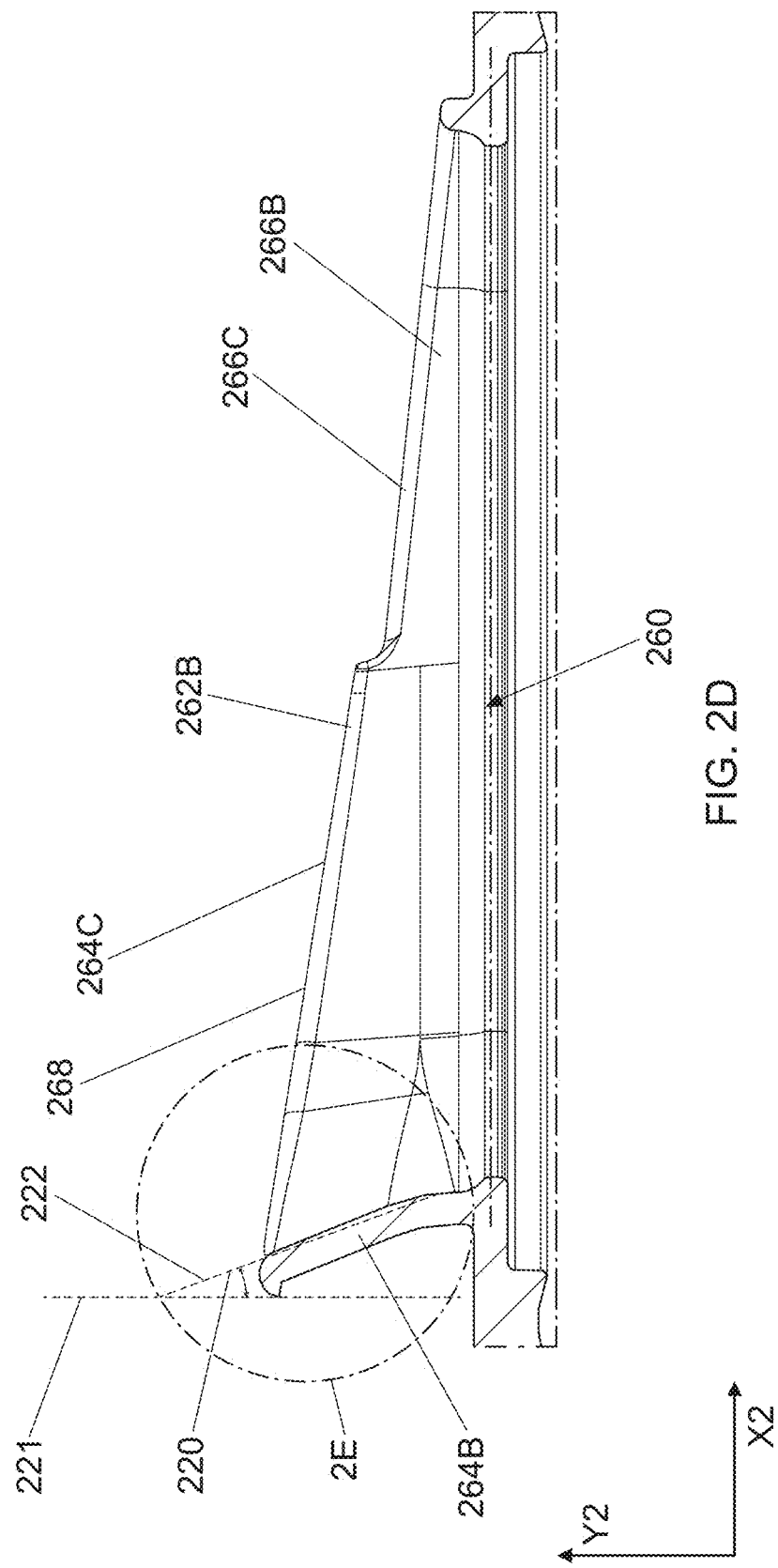

LIQUID CONTAINER AND CAP

FIELD OF THE INVENTION

Containers having liquids and the methods of making caps for such containers to facilitate refilling of containers.

BACKGROUND OF THE INVENTION

The desire for products that demonstrate responsible sourcing and/or are eco-friendly is at an all-time high. It is predicted that such demand will only increase going into the future. One of the particular focus areas for sustainability regards the re-use of containers. Re-using containers can cut down on the use of plastic material as well as the carbon emissions that are often utilized in making such containers.

Supplying refill containers can encourage the refill and re-use of other containers; however, refilling can be tedious. For example, many consumers perceive the refilling of a container to be difficult, particularly where the container being refilled has a small opening through which the refill contents pass. Additionally, consumers may view the task of refilling to be messy as the refill containers tend to glug their liquid contents. Unfortunately, in addition to the mess, the glugging can slow down the process of refilling and discourage future refill attempts.

Based on the foregoing, there is a need for containers that facilitate the refill of other containers. Additionally, there is a need for a method of refilling containers which facilitated over that of conventional containers.

SUMMARY OF INVENTION

The containers of the present disclosure may comprise a viscous liquid. Based upon the design of the containers and/or caps of the present disclosure, refilling of a secondary container is facilitated which can encourage the re-use of such secondary containers.

Containers of the present disclosure may comprise a liquid composition therein. The containers of the present disclosure may further comprise: a body portion; a neck disposed on the body portion, the neck having a neck opening; a first longitudinal side edge and an opposing second longitudinal side edge defining a container width therebetween; a cap positioned on the neck, the cap comprising a cap plate having an elongated opening comprising a width of from about 10 mm to about 35 mm, more preferably from about 13 mm to about 28 mm, or most preferably from about 13 mm to about 20 mm, the elongated opening further comprising a front portion and an opposing back portion and a middle portion disposed therebetween, wherein the front portion comprises a front edge and wherein the back portion comprises a back edge; wherein the back edge is spaced from the second longitudinal side edge by less than about 45 percent of the container width, more preferably less than about 43 percent of the container width or even more preferably less than about 41 percent of the container width; and wherein the liquid composition has a viscosity of from about 1 mPa·s to about 10,000 mPa·s, preferably from about 100 mPa·s to about 5,000 mPa·s, more preferably from about 300 mPa· s to about 2,000 mPa·s, or most preferably from about 500 mPa·s to about 1,500 mPa·s.

BRIEF DESCRIPTION OF THE DRAWINGS

While multiple embodiments are disclosed, still other embodiments of the present invention will become apparent to those skilled in the art from the following detailed description, which shows and describes illustrative embodiments of the invention. Accordingly, the Figures and detailed description are to be regarded as illustrative in nature and not restrictive.

FIG. 2D is a schematic representation showing a cross-section of the cap of FIG. 2A;

DETAILED DESCRIPTION OF THE INVENTION

Figure 1A:
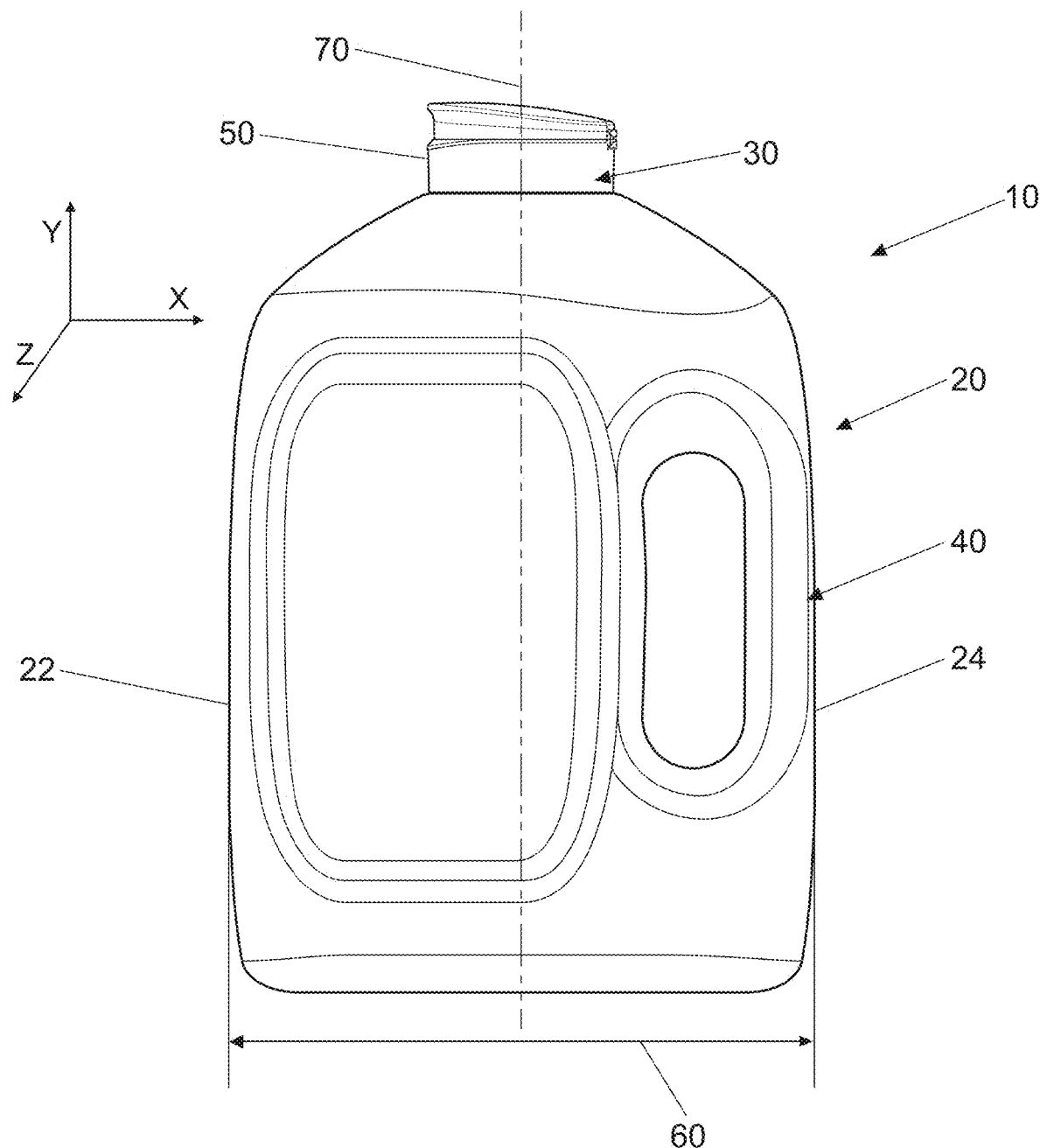
FIG. 1A is a schematic representation of a container constructed in accordance with the present disclosure.

The containers/caps of the present disclosure can facilitate the refilling of other containers thereby encouraging refilling and re-use. In turn, this can reduce the amount of material going to landfills as well as reduce the amount of plastic bottles being produced. Additionally, the containers/caps of the present disclosure can reduce the amount of time needed to refill a container by reducing the amount of glugging exhibited by the refilling container.

Many consumers do not like to re-use/refill containers because of the potential for the creation of messes as well as the time it takes to refill a container. One of the biggest culprits in the potential for mess creation as well as slowing down the refill process is glugging. As contents exit a container at a first flow rate, empty volume forms within the container. A negative pressure is associated with this empty volume. If a flow rate of air is not equal to or substantially equal to the first flow rate, then over a period of time while pouring, the negative pressure within the container will build until it is sufficient to interrupt the first flow rate which causes glugging.

Additionally, as the air has a lower density than the contents exiting the container, the air will try to make its way to the highest point of the container during pour. It is further believed that where the influx of air passes through a large distance of the contents to reach the highest point, the passing of the air through the contents can cause waves in the contents. These waves created by the passage of airflow can result in glugging as well.

Glugging causes a decrease then an increase in the flow rate of contents alternatingly, which can exacerbate the refilling process and facilitate spillage of the contents during refilling. Additionally, as noted, glugging interrupts and decreases the average flow rate to allow air flow into the container. Glugging can reduce the average flow rate of the contents such that a refilling action requires more time than that where glugging is reduced/eliminated.

The containers/caps of the present disclosure reduce glugging and facilitate the refill process. The containers of the present disclosure comprise a body portion and a neck disposed on the body portion. The neck comprises a neck opening. A cap is positioned on the neck. The cap may be removably attached to the neck via threads, snap fittings, or the like. It is worth noting that the cap, or at least a portion thereof, may be unitarily formed with the neck/body portion. In such configurations, the lid may be provided as a unitary or discrete part which attaches to the cap for closing. Some exemplary processes for creating such configurations include 3D printing and/or injection blow molding.

The cap comprises a cap plate comprising an elongated opening in communication with the neck opening such that liquid passing through the neck opening passes through the elongated opening. The elongated opening has a front portion, an opposing back portion, and a middle portion disposed between the front and back portions. Each of the front portion, back portion and middle portion can take up about one third of a length of the elongated opening. The front portion comprises a front edge, the back portion comprises a back edge, and a pair of opposing side edges extend between and join the front edge and the back edge.

A lid may be connected to the cap and is capable of sealing the elongated opening when the lid is in a closed position. The lid may be hingedly connected to the cap, e.g., a fliptop lid. Preferably the lid is connected to the cap and can be opened by a user with one hand. For example, the lid is preferably configured to comprise a finger/thumb stop which can allow a use to easily flip the lid open with the same hand in which they are carrying the container. The lid may further comprise a substantially flat-horizontal portion (when the cap is oriented in the horizontal position). The substantially flat-horizontal portion may make up a large portion of the surface area of the lid. During transport, the substantially flat-horizontal portion can reduce the likelihood of containers stacked thereon from slipping off.

The elongated opening may comprise any suitable shape. For example, the elongated opening may comprise an oval shape, discorectangle, or the like. The front edge and/or back edge may be rounded.

The elongated opening can have a width extending between the opposing side edges of from between about 10 mm to about 35 mm, more preferably from about 13 mm to about 28 mm, or most preferably from about 13 mm to about 20 mm specifically including all values within these ranges and any ranges created thereby. It is worth noting that the elongated opening may have a variable width along its length. For example, the front portion may have a front width, the back portion may have a back width, and the middle portion may have a middle width. The middle width may be greater than at least one of the front width and the back width. Preferably the middle width is greater than the front width. More preferably, the middle width is greater than both the front and the back widths. The width difference is described in additional detail herein.

The elongated opening can have a length between the front edge and the back edge of at least about 22.0 mm, more preferably at least about 27.0 mm or even more preferably at least about 33.0 mm, specifically including all values within these ranges or any ranges created thereby. For example, the elongated opening can have a length of from between about 22 mm to about 40 mm, more preferably from about 25 mm to about 36 mm or even more preferably from about 27 mm to about 33 mm, specifically including all values within these ranges and any ranges created thereby. It is believed that the length of the elongated opening can reduce the likelihood of glugging by having a sufficient length to reduce the distance that airflow travels through the contents of the container during pour.

The container comprises a first longitudinal side edge and an opposing second longitudinal side edge, preferably comprised by the body portion. The first longitudinal side edge and the second longitudinal side edge define a container width therebetween. Regarding the elongated opening, the front edge is more proximal to the first longitudinal side edge than the back edge, and contrastingly, the back edge is more proximal to the second longitudinal side edge than the front edge.

Any suitable container width may be utilized. For example, containers having a width of from between about 50 mm to about 165 mm may be utilized, specifically including all values within this range and any ranges created thereby. In one specific example, the container may have a width of about 144 mm. In another example, the container width may be about 155 mm. In yet another example, the container width may be about 158 mm. Still in another example, the container width may be about 160.14 mm. In yet another example, the container width may be about 86 mm. In yet another example, the container width may be about 115 mm.

In a resting position, sitting on a horizontal surface, the first longitudinal side edge and the second longitudinal side edge may be oriented in a generally vertical position. In a "refill position", the first and second longitudinal side edges may be oriented in a generally horizontal position. In such configurations, the second longitudinal side edge may be positioned superjacent to the first longitudinal side edge. Additionally, in such configurations, a handle may be provided adjacent the second longitudinal side edge allowing a user to easily grasp the container and control the container during the refill process. Similarly, a pour angle of a container is determined by the angle of intersection between a longitudinal axis of a container and a horizontal plane.

It is believed that the disposition of the back edge in relation to the second longitudinal side edge can impact air flow entrance into the container during dispensing of the contents. For example, in the refill position, a shorter distance between the back edge and the second longitudinal side edge can mean that air entering the container has a smaller distance to travel to reach the highest point within the container. This smaller distance can lead to less liquid volume that entering air needs to traverse during pouring.

Containers of the present disclosure may be configured such that the back edge is spaced from the second longitudinal side edge ("airflow distance") by less than about 45 percent of the container width, more preferably less than about 43 percent of the container width or even more preferably less than about 41 percent of the container width, specifically including all values within these ranges and any ranges created thereby. Similarly, the front edge can be spaced from the first longitudinal side edge by greater than about 40 percent of the container width, more preferably greater than about 50 percent, or even more preferably greater than about 55 percent of the container width, specifically including all values within these ranges and any ranges created thereby.

While in theory, the airflow distance can be zero, this would cause additional difficulties in the refilling process. For example, where the air flow distance is zero, in the refill position only a limited amount of the contents of the container would be available for dispensing. The user, very shortly after beginning the refill process, would be forced to increase the pour angle of the container such that a bottom of the container is at a higher elevation than the elongated opening. This can be a very uncomfortable position to hold, particularly where the container has a sufficient amount of mass associated with it. With the above in mind, the airflow distance can be from between about 20 percent to about 60 percent of the container width, more preferably from about 30 percent to about 50 percent of the container width, or even more preferably from about 35 percent to about 45 percent of the container width, specifically including all values within these ranges and any ranges created thereby. Independently or in conjunction therewith, the neck opening of the container may be disposed on the container such that in a refill position, with an internal volume of the container being substantially full with liquid composition, at least 20 percent by volume, more preferably at least about 40 percent by volume or even more preferably at least about 50 percent by volume of the liquid composition can be dispensed, specifically including all values within these ranges and any ranges created thereby.

With the above in mind, the airflow distance can be any suitable percentage of the width of the container. For example, the airflow distance can be from between about 34 percent to about 45 percent, more preferably from about 36 percent to about 43 percent or even more preferably from about 37 percent to about 40 percent of the container width, specifically including all values within this range and any ranges created thereby.

In order to further facilitate the refill process, the cap plate may further comprise a wall that surrounds, at least in part, the elongated opening. The wall may comprise a front wall portion extending from the cap plate proximal the front edge and an opposing back wall portion proximate the back edge extending from the cap plate, and a middle wall portion extending from the cap plate and disposed between the front wall portion and the back wall portion. Much like the elongated opening, each of the front wall portion, back wall portion and middle wall portion can take up about one third of a length of the wall. It is worth noting that configurations are contemplated where the wall comprises the front wall portion without the middle portion and/or without the back wall portion.

The front wall portion may extend to a further extent from the cap plate than the back wall portion. The middle wall portion may extend from the cap plate to a further extent than the back wall portion but to a lesser extent than the front wall portion. The difference in wall height between the front wall portion and the back wall portion facilitates the lid's engagement with the cap plate. The height of the wall is discussed in additional detail herein.

Additionally, to facilitate the refilling process, particularly where the container is in the refill position, the front wall portion may comprise a front surface and an inner surface that is disposed at a first angle with respect to a vertical reference line. The first angle may be configured such that in the refill position, the inner surface and/or the front surface, or at least a part there of, breaks a plane of a neck opening of the container being refilled. It is believed that the first angle of the inner surface can help reduce the liquid composition from wrapping around the front wall and reduce the likelihood of spillage. The first angle may be from between about 15 degrees to about 90 degrees, more preferably from about 30 degrees to about 80 degrees, or even more preferably from about 40 degrees to about 70 degrees, specifically including all values within these ranges and any ranges created thereby.

It is worth noting that where the front surface is angled, e.g. at the first angle, this may also be beneficial in the docking of the containers of the present disclosure with a container being refilled ("secondary container"). In the refill position, the front surface can engage a neck of the secondary container. The first angle can encourage the neck to finally dock against the cap plate. The angle of the front surface may be the same as that of the inner surface or may be different. The angle of the front surface with respect to the vertical reference line may comprise the values provided for the first angle.

The front wall portion may additionally comprise a pair of side surfaces which are each disposed at a side angle with respect to the cap plate. The side angle can be the same as or greater than the first angle. It is worth noting that the side angle is preferably configured to reduce wrapping of the liquid contents around the side surfaces. It is believed that such wrapping of the liquid contents would increase where the side angle is very small compared to the cap plate. Preferably, the side angle is within the ranges expressed for the first angle described herein.

The docking can further be encouraged where the front portion further comprises a first part and a second part. The first part may be disposed more distal from the cap plate than the second part, and the first part may comprise the first angle. The second part may be disposed at a second angle which reduces the likelihood of further sliding of the neck of the secondary container during the refill process.

The front wall portion may further comprise a lip disposed on a distal end of the front wall. The lip can extend outboard of the front surface away from the elongated opening. During the refill process, the lip may be utilized as a guide and reduce the likelihood of the front wall sliding out of engagement with the neck of the secondary container.

As noted previously, the containers of the present disclosure encourage the re-use of refillable containers ("secondary containers") thereby reducing the amount of materials going to landfill. Additionally, where the material of the secondary containers is plastic, the containers of the present disclosure help to reduce the amount of plastic being disposed as well as manufactured. In addition, the containers of the present disclosure may themselves comprise plastic material. For example, the body portion and/or neck of the containers of the present disclosure may comprise polypropylene, high density polyethylene or polyethylene terephthalate. Similarly, the cap may comprise a material selected from at least one of: high density polyethylene, low density polyethylene or polypropylene.

Regardless of the material utilized for the body portion, neck or cap, the containers of the present disclosure may comprise recyclable material. For example, the cap may be removably affixed to the neck such that the cap can be separated from the neck to allow for separate recycling streams for the cap and the body portion/neck. Preferably, the cap, body portion and neck comprise the same material and may be recycled in the same recycling stream.

Forms are contemplated where the cap may be removable and re-usable by users. In such configurations, the user may remove the cap from the container and recycle the container sans the cap. The user may then purchase a new refill container of liquid composition and affix the cap thereto. Such configurations further reduce the amount of plastic material produced. Furthermore, in such configurations, the cap may be designed to fit a number of containers. As an example, a first manufacturer may market the cap as being compatible with containers of a second manufacturer.

Additionally, the containers of the present disclosure may comprise recycled material. For example, the containers of the present disclosure may comprise at least about 20 wt percent recycled material, preferably at least about 30 wt percent, even more preferably at least about 50 wt percent, even more preferably at least about 75 wt percent and most preferably at least about 90 wt percent of post-industrial recycled content and/or post-consumer recycled content. As used herein "post-consumer recycled plastic" or "PCR plastic" refers to material that is made from the items that consumers recycle every day, like plastic bottles. As used herein "post-industrial recycled plastic" or "PIR plastic" refers to material that is made from plastic scrap that is generated as waste from an industrial process.

As noted herein, the containers of the present disclosure comprise viscous liquids, preferably cleaning compositions. For example, the containers of the present disclosure may comprise laundry detergents, fabric softeners, hand dish washing detergents, automatic dishwashing detergents, shampoo, hair conditioner, hair colorant, and the like. The viscosity of the liquids within the containers of the present disclosure are from about 1 mPa·s to about 10,000 mPa·s, preferably from about 100 mPa·s to about 5,000 mPa·s, more preferably from 300 mPa·s to about 2,000 mPa·s, or most preferably from about 500 mPa·s to about 1,500 mPa·s as measured in accordance with the viscosity test method herein.

It is believed that the width of the elongated opening and the viscosity of the liquid can be synergistically paired. For example, as the liquid exits the elongated opening and the wall, a boundary layer may be formed along a periphery of the elongated opening and wall. It is believed that the width of the elongated opening and the viscosity of the liquid create a sufficiently thick boundary layer such that flow exiting the elongated opening have a "V" shape. Particularly, at the top of the liquid flow, a notch or depression exists which facilitates air entering into the container.

It is worth noting that the above "V" shape during pour may be limited to those liquid compositions having a higher viscosity, e.g., 100 mPa·s or more. For those liquids having a lower viscosity, the "V" shape may not be exhibited. However, it is believed that due to the lower viscosities, the flow rate of the liquid contents from the containers/cap of the present disclosure can still provide the reduced glugging benefit.

Additionally, it is believed that glugging is typically more prevalent in those liquids having a higher viscosity, e.g. 1000 centipoise or greater. With lower viscosity liquids, generally higher flow rates can be achieved with larger neck openings. However, where liquids are expelled at a higher flow rate, more air is encouraged to enter the container to offset the vacated space of the liquid. This increased amount of air can induce glugging even in lower viscosity liquids. It is believed that by balancing flow rate and air flow into the container, glugging and good flow rates can be achieved. Collectively, the reduced glugging and good flow rate can encourage users to refill existing containers which ultimately leads to less material being sent to landfills For example, a neck opening having neck opening area of about 1300 mm$^2$ can provide increased flow rate over that of a smaller area; however, the increased flow rate is typically at the cost of increased glugging and decreased control of the fluid by the user. The use of the caps of the present disclosure effectively reduce the neck opening area by about 20 percent, more preferably by about 30%, even more preferably by about 40 percent, more preferably by about 50 percent, even more preferably by about 60 percent, or even more preferably by about 68 percent. In some examples, the cap may effectively reduce the neck opening area from between about 20 percent to about 68 percent, preferably from about 30 percent to about 68 percent, more preferably from about 40 percent to about 68 percent, even more preferably from about 50 percent to about 68 percent, or even more preferably from about 60 percent to about 68 percent. It is believed that the reduction of the neck opening area by the caps of the present disclosure along with the configuration of the elongated opening, as described herein, can provide good flow rates as well as reduced glugging which can increase the control of the liquid within a container and facilitate the refill process by a user.

Figure 1B:
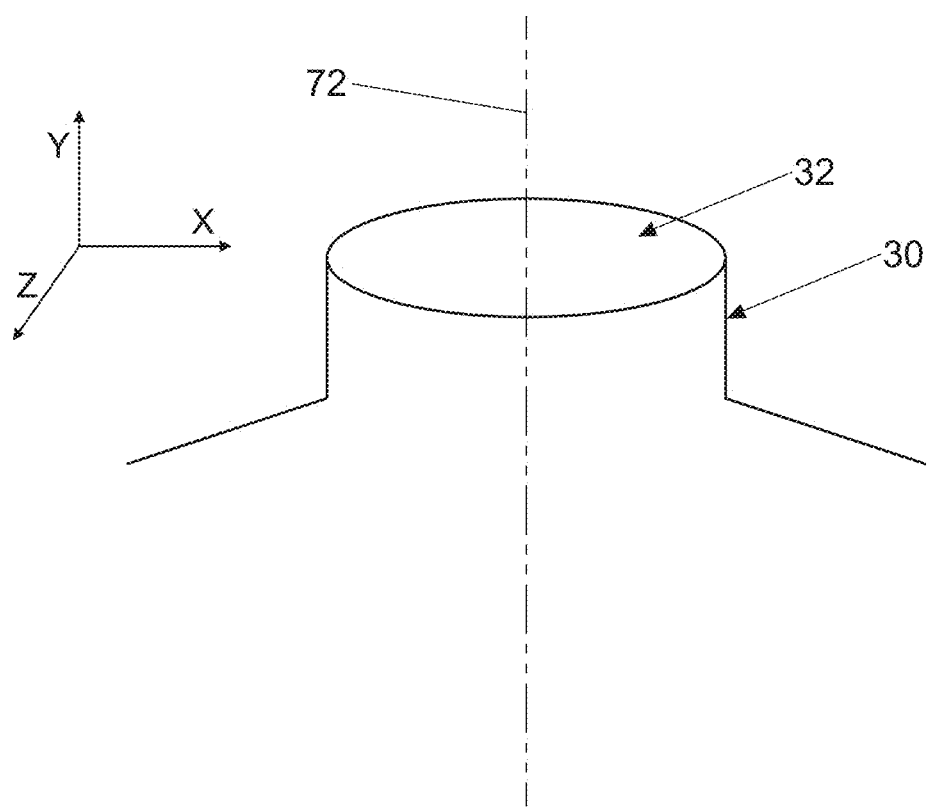
FIG. 1B is a schematic representation of a portion of the container of FIG. 1A.
Figure 2A:
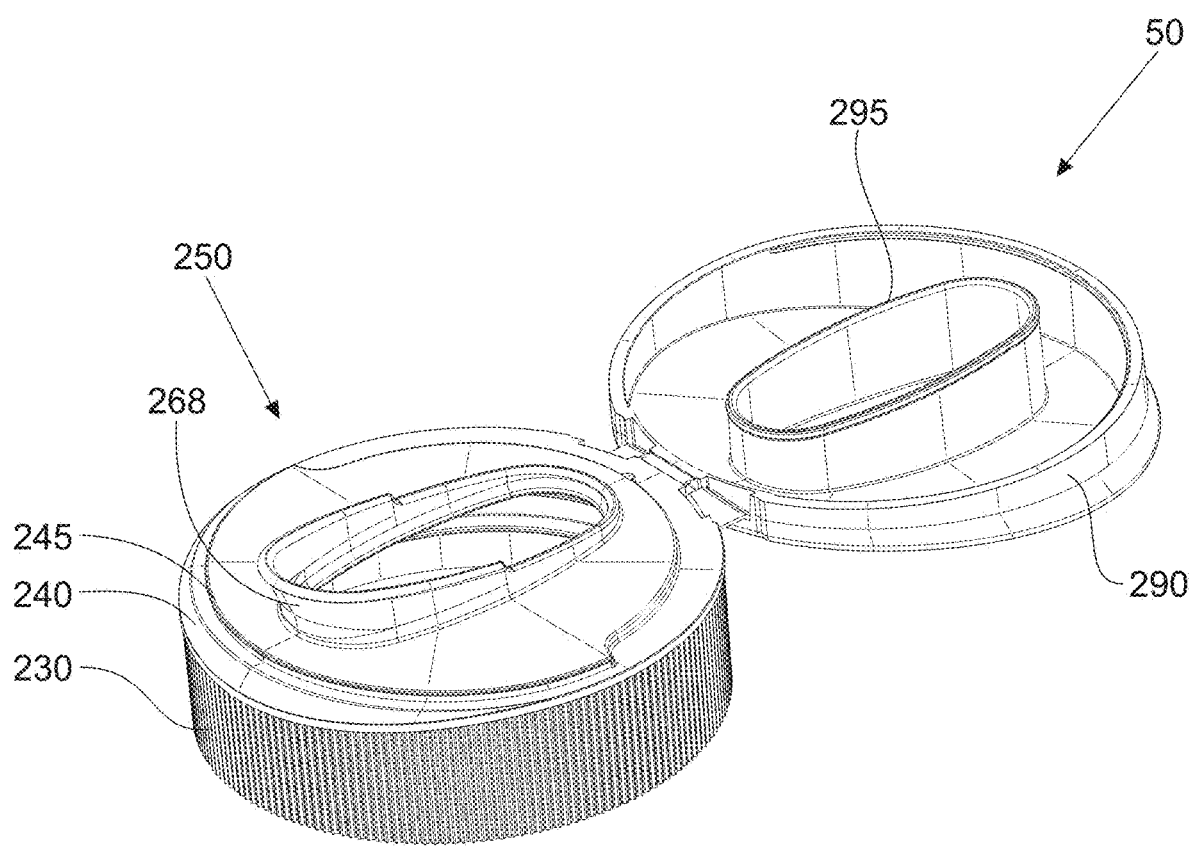
FIG. 2A is a schematic representation showing a perspective view of a cap constructed in accordance with the present disclosure.
Figure 2B:
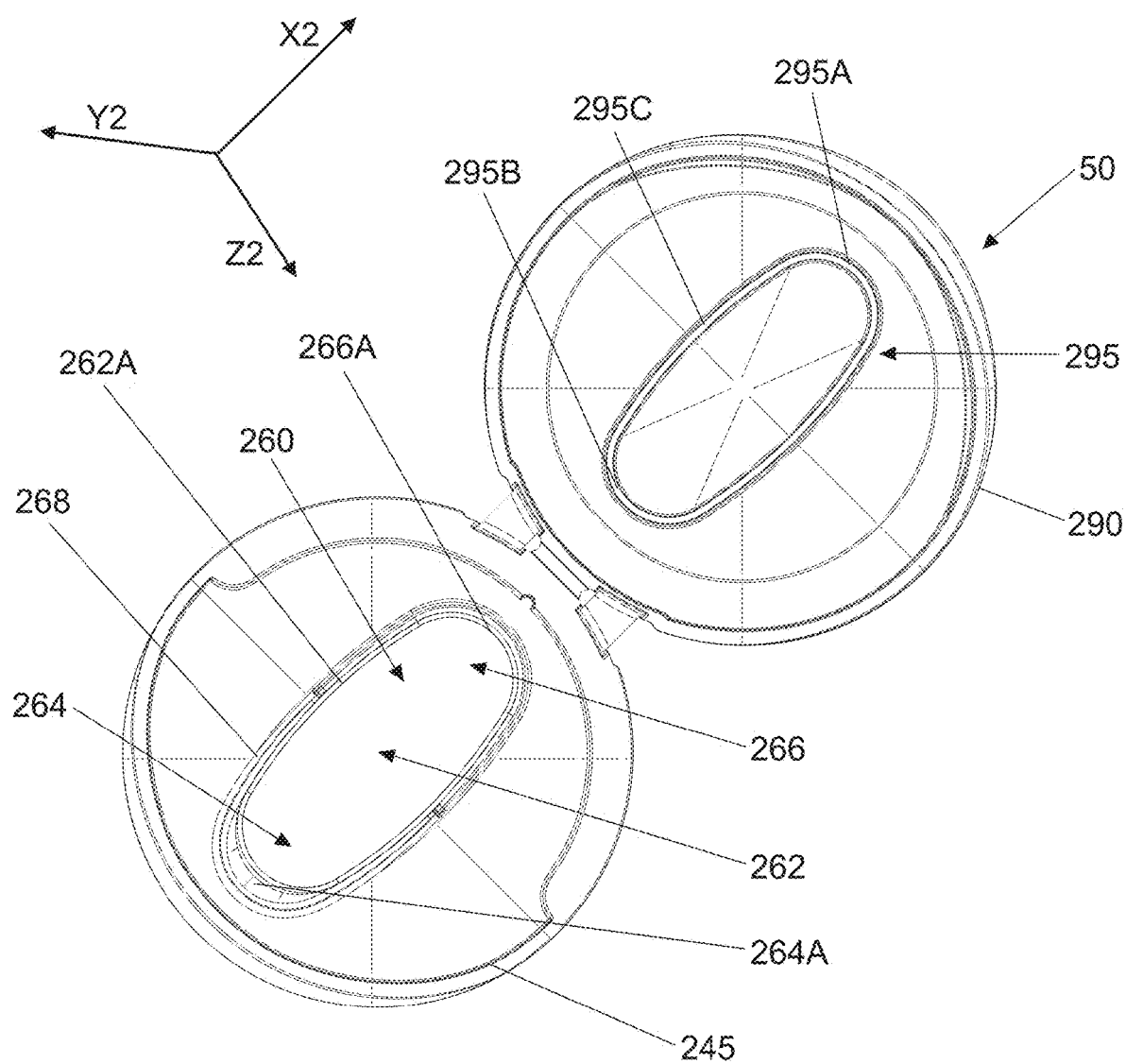
FIG. 2B is a rotated view of the cap of FIG. 2A.
Figure 2C:
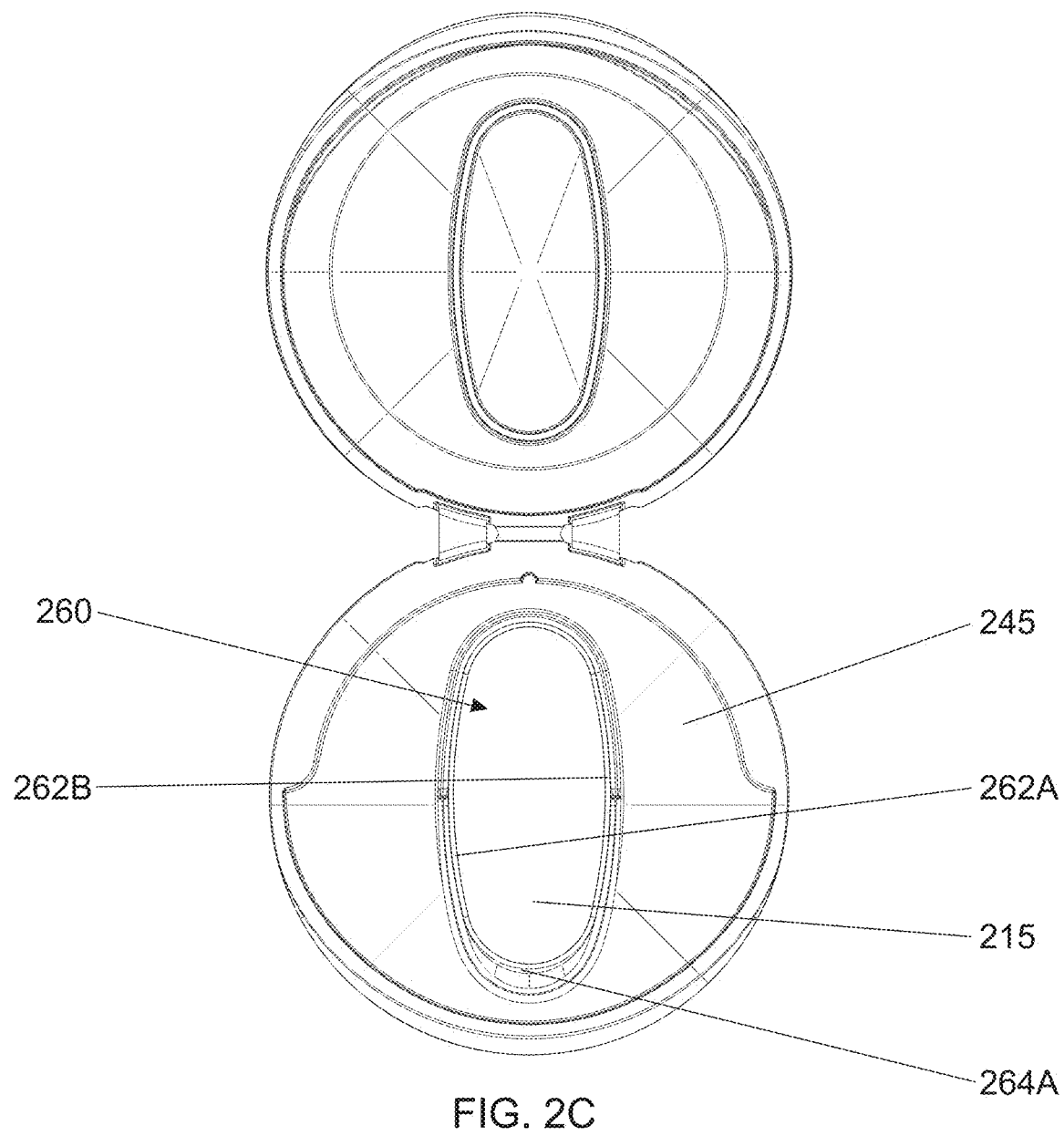
FIG. 2C is a top view of the cap of FIG. 2A.
Figure 2E:
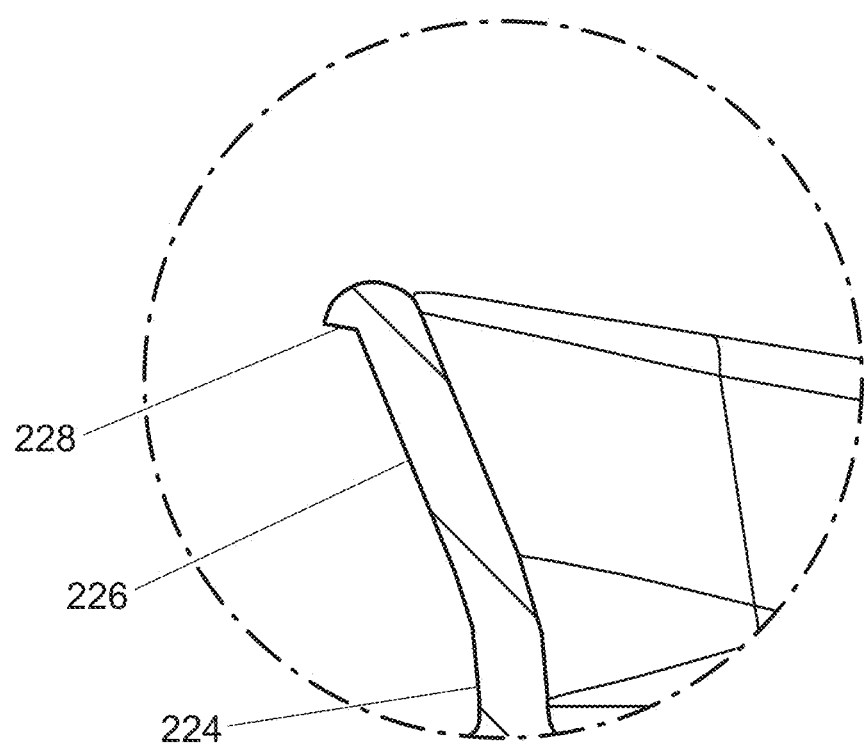
FIG. 2E is a schematic representation showing a close up view of the cross-section of FIG. 2D.
Figure 2F:
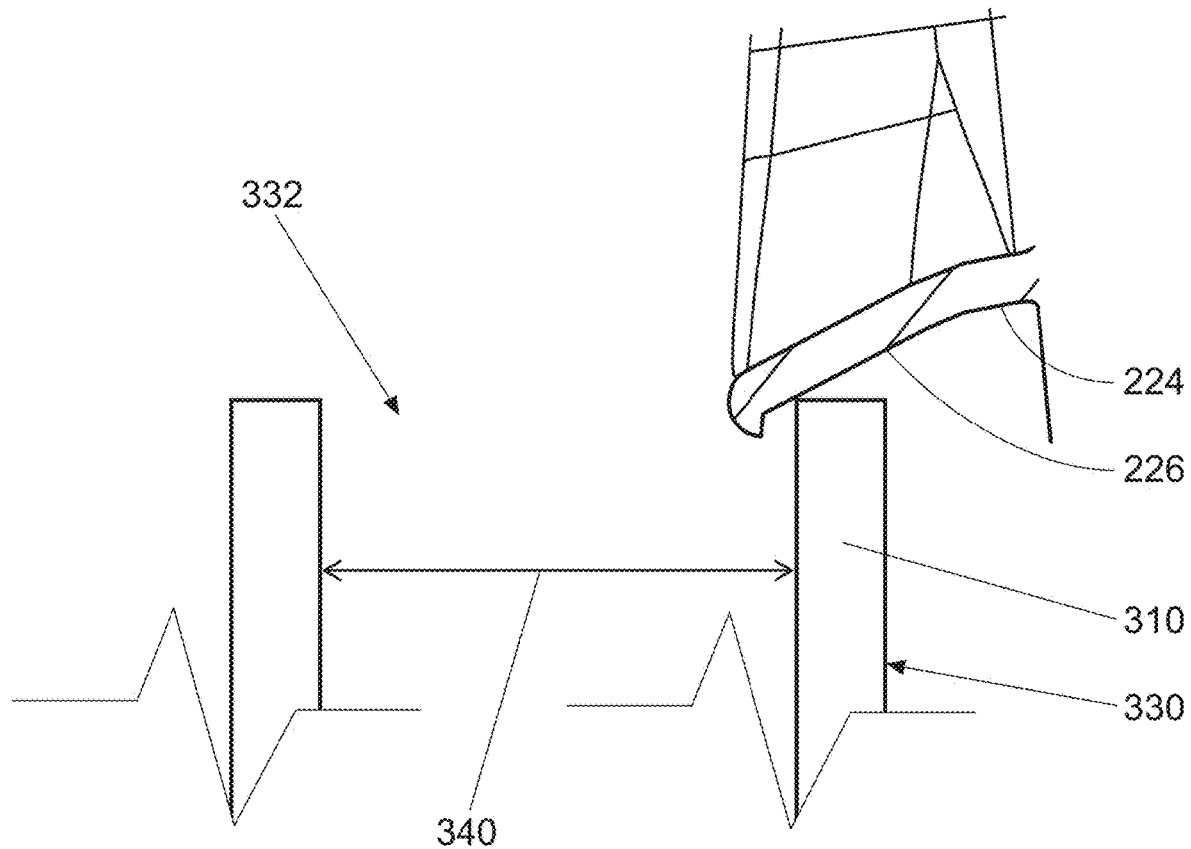
FIG. 2F is a schematic representation showing a portion of the cap of the present disclosure engaging a neck portion of a secondary container.

Regarding FIGS. 1A and 1B, a container 10 in accordance with the present disclosure is shown. The container 10 comprises a body portion 20, a neck 30 and a cap 50. As shown, the cap 50 is attached to the neck 30. Additionally, the container 10 may comprise a handle 40. The handle 40 can facilitate the refilling of secondary containers (containers being refilled) by allowing a user to grasp and hold the container 10 more steady.

The container 10 comprises a first longitudinal side edge 22 and an opposing second longitudinal side edge 24. A container width 60 generally parallel to an X-axis is defined between the first longitudinal side edge 22 and the second longitudinal side edge 24. Additionally, a width bisecting plane 70 bisects the container width 60 and extends generally parallel to a Y-axis. It is worth noting that the first and second longitudinal side edges 22 and 24 are not required to be straight, rather in general these edges extend in a longitudinal direction (generally parallel to the Y-axis) when the container is in a non-dispensing position, i.e., a bottom surface disposed on a horizontal surface.

FIG. 1B shows a portion of the container with the cap removed such that the neck 30 is visible. As shown, the neck 30 comprises a neck opening 32 which is generally circular in shape. The neck opening 32 comprises a center point and a center point line 72 extending generally parallel to the Y-axis and intersecting the center point of the neck opening 32. The containers of the present disclosure may comprise a neck opening size which is the same as that described for secondary containers described herein. It is worth noting however, that the neck size of the secondary containers herein are preferably smaller than those of the containers described herein.

Regarding FIGS. 2A-2F, the cap 50, as shown, comprises a lid 290 and a neck engagement portion 250. The neck engagement portion 250 may comprise a sidewall 230 and a cap plate 240. The sidewall 230 may be fitted with threads to allow for threaded, sealing, engagement with the neck of the container. Alternatively or in conjunction with threads, the sidewall 230 may be fitted with snap fittings to sealingly engage with the neck of the container. The lid is discussed in additional detail herein.

The cap plate 240 may comprise an outer sealing ring 245, a wall 268 and an elongated opening 260. The elongated opening 260 comprises a front portion 264, a back portion 266 and a middle portion 262 disposed between the front portion 264 and the back portion 266. As shown, the elongated opening 260 may be surrounded, at least in part, by the wall 268. The elongated opening 260 has a length generally parallel to an X2-axis and a width generally parallel to a Z2-axis.

As shown, the elongated opening 260 further comprises a front edge 264A, the back portion 266 comprises a back edge 266A, and the middle portion 262 may comprise a pair of opposing side edges 262A and 262B. Both the front edge 264A and the back edge 266A may be rounded. Alternatively, the front edge 264A may comprise a rounded edge while the back edge 266A comprises a flat edge. Any suitable shape may be utilized for the elongated opening 260. For example, the elongated opening 260 may comprise an oval or a disco rectangle.

The wall 268 may comprise a front wall portion 264B and opposing back wall portion 266B and a middle portion 262B. The front wall portion 264B is proximal to the front edge 264A, and the back wall portion 266B is proximal to the back edge 266A. As shown, the front wall portion 264B may extend from the cap plate 240 to a further extent than the back wall portion 266B. Similarly, the middle wall portion 262B may extend from the cap plate 240 to a greater extent than the back wall portion 266B but to a lesser extent than the front wall portion 264B.

Additionally, as shown, the front wall portion 264B may comprise a front top surface 264C, and the back wall portion 266B may comprise a back top surface 266C. The front top surface 264C may be angled with respect to the cap plate 240. Similarly, the back top surface 266C may be angled with respect to the cap plate 240. The angle of the front top surface 264C may be greater than the angle for the back top surface 266C. In one specific example, the front top surface 264C may be angled with respect to the cap plate 240 at an angle of about 9 degrees. In one specific example, the back top surface 266C may be angled with respect to the cap plate 240 at an angle of about 6 degrees. It is worth noting that the front top surface 264C and the back top surface 266C are not required to be angled. It is believed that such inclination can facilitate closing/sealing of the lid to the neck engagement portion.

The wall 268 and portions thereof, may comprise a height which is generally parallel to a Y2-axis. The height of the wall 268, particularly the front wall portion 264B, may comprise any suitable height. However, the height of the front wall portion 264B should be carefully considered in view of a neck opening 332 of a secondary container. For example, the neck opening 332 is generally in the shape of a circle and has an inner diameter 340, e.g., from about 18 mm to about 40 mm or from about 22 mm to about 35 mm, specifically including all values within this range and any range created thereby. In order to reduce the likelihood of spillage, the height of the front wall portion 264B is preferably less than 50 percent of the inner diameter 340 of the neck opening 332 of the secondary container, more preferably less than 40 percent, or even more preferably less than 35 percent, specifically including all values within these ranges and any ranges created thereby.

While in theory, the height of the front wall portion 264B could be zero, such configurations are believed to facilitate wrapping of the fluid around the sides of the neck 330 of the secondary container and facilitate spillage. Additionally, a wall height of zero would not allow for the facilitated docking and pouring process provided by the containers of the present disclosure. It is believed that a minimum height of the front wall portion 264B can be able to accommodate a thickness of a neck wall 310 of the secondary container. For example, the height of the front wall portion 264B may be at least 3 mm, more preferably at least 4 mm, or even more preferably at least 5 mm, specifically including all values within these ranges and any ranges created thereby. In one example, the height of the wall portion is about 8 mm.

The front wall portion 264B may comprise a first part 226, a second part 224 and a lip 228. As noted herein, the second part 224 can assist the user in resting the container of the present disclosure on the neck 330 of a secondary container thereby increasing the stability of the container and reducing the likelihood of spillage. The first part 226 can be configured to move the container of the present disclosure to the second part 224 when the front wall portion 264B is engaged with the neck 330 of the secondary container. While any suitable angle may be utilized for the first part 226, a first angle 220 between the an inner surface reference line 222 of the first part 226 and a vertical reference line 221 can be from between about 10 degrees to about 80 degrees, more preferably from about 20 degrees to about 70 degrees, or even more preferably from about 30 degrees to about 60 degrees from the vertical reference line 221, specifically including all values within these ranges and any ranges created thereby. The inner surface reference line 222 is coplanar with an inner surface of the first part 226.

Additionally, as shown the front wall portion 264B may further comprise a lip 228 that extends outboard of an outer surface of the front wall portion 264B away from the elongated opening 260. When the front wall portion 264B is engaged with the neck wall 310, the lip 228 can reduce the likelihood that the front wall portion 264B slides off of the neck 330. This can be a particularly useful feature where the container 10 (shown in FIG. 1A), has a large mass associated therewith. For example, to hold a container with large mass in the refill position can be difficult for many users. After even a small period of time, the users' hands may move/shake to some extent due to the mass being supported. The lip 228, as well as the front wall portion 264B, the first angle 220, the first part 226, the second part 224, the side angle, independently or any combination thereof, can all be beneficial in helping to reduce the likelihood that the front wall portion 264B slips off the neck 330.

As shown, the lip 228 may be angled with respect to the cap plate 240. The angle of the lip 228 may be the same as that of the front top surface 264C. It is believed that the angle of the lip relative to the cap plate 240 should be relatively small as larger angles may not reduce the likelihood of the front wall portion 264B slipping off of the neck 330 to the extent that smaller angle would.

The wall 268 and relevant portions thereof may comprise an inner surface that is flush with a periphery of the elongated opening 260. In other words, from the periphery to an inner surface of the wall 268, the transition between the two may be smooth.

The cap 50 may comprise one or more mechanisms for sealing the elongated opening 260. For example, the lid 290 may comprise a sealing element 295 extending from a surface of the lid 290 such that when in the closed position, the sealing element 295 seals the elongated opening 260. In such configurations, the sealing element 295 may engage an inner surface of the wall 268 and/or the periphery of the elongated opening 260 to create a seal when the lid 290 is in the closed position.

As shown, the sealing element 295 can have a substantially similar shape to that of the elongated opening 260, including an increased width at a middle sealing edge 295C corresponding to the middle width of the elongated opening 260 disposed between a front sealing edge 295A and a back sealing edge 295B. The inventors have surprisingly found that for configurations where the sealing element 295 engages an inner surface of the wall 268 and/or periphery of the elongated opening 260, without an increased middle width, leakage would occur. For example, where a sealing element comprises a substantially constant width between the front sealing edge 295A and the back sealing edge 295B, the middle sealing edge 295C tends to deflect inward from the inner surface of the wall 268 and/or periphery of the elongated opening 260. Alternatively, the sealing element 295 may be configured to engage an outer surface of the wall 268.

Another sealing mechanism regarding the cap 50 is the sealing ring 245. The sealing ring 245 can help secure the lid 290 to the cap plate 240. The containers of the present disclosure may comprise additional sealing features to protect against leakage during the rigors of shipping/transport/ stocking, etc. These additional sealing features can ensure that if the container is dropped, the lid is less likely to open due to impact. This can reduce the likelihood of accidental spillage of the liquid contents.

While the lid may be configured to tightly engage with the cap plate to reduce the likelihood of accidental opening when the container is dropped, such tight engagement may hinder use as removing the lid from the cap plate may require a large amount of force. Additional sealing features for the containers/caps of the present disclosure include a liner 215 which can be positioned between the cap and the neck of the container. The liner may be removably joined to the neck of the container and/or removably joined to the cap. To use, the user can simply remove the cap from the container and remove the liner.

The liner can be any suitable material which is resistant to the liquid composition within the container. Some examples include wax coated paper, foil, plastic, a mixture thereof.

Still another sealing feature includes an outer wrap which surrounds, at least in part, the lid and the cap while the lid is engaged in the closed position with the cap plate. Materials for such wraps are known in the art.

Figure 3:
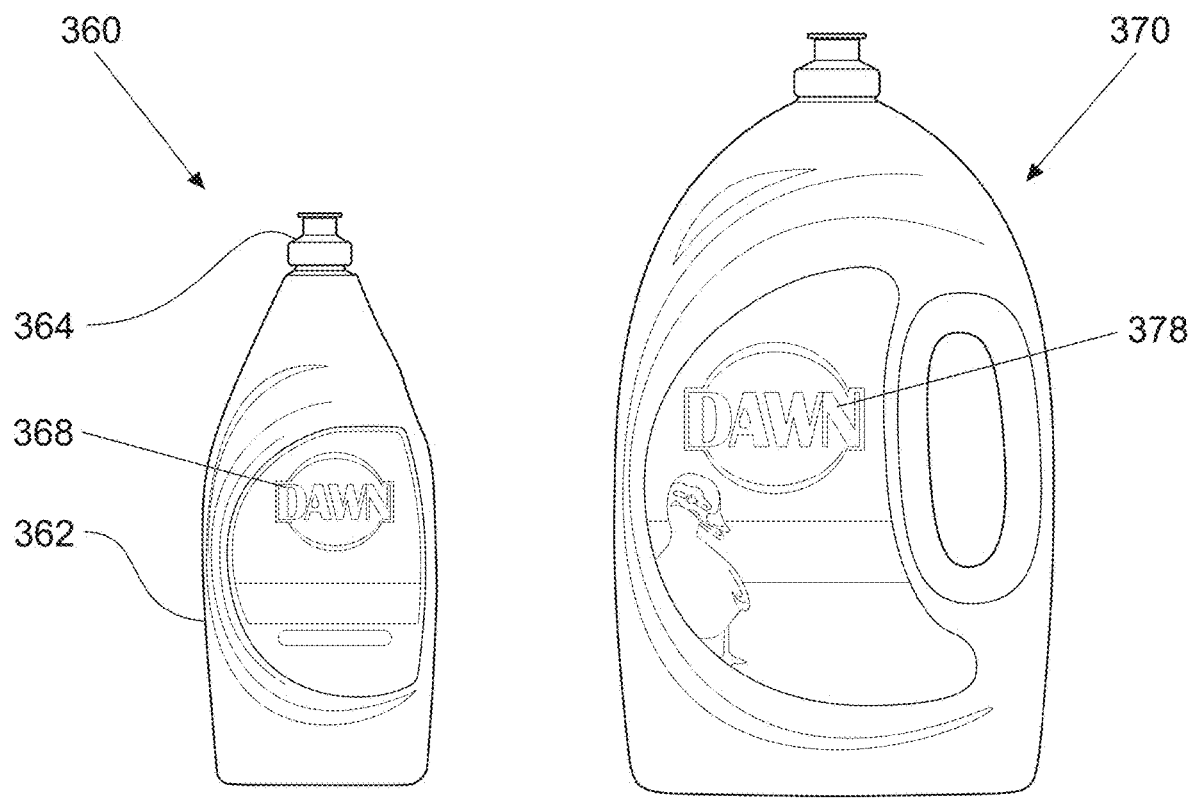
FIG. 3 is a depiction of an exemplary array of the present disclosure showing a primary and secondary container.

Referring now to FIG. 3, as noted previously the containers of the present disclosure can facilitate the refilling of secondary containers 360. The secondary containers may be configured similar to the containers of the present disclosure. For example, secondary containers 360 may comprise a secondary container body portion 362 and a secondary neck 364 (as shown beneath a cap) connected to the secondary body portion 362. The secondary neck 364 may comprise a secondary neck opening having a diameter of from between about 18 mm to about 40 mm or from about 22 mm to about 40 mm. The secondary container 360 generally has a secondary volume that is less than a volume of the containers of the present disclosure.

A primary container 370 may be configured as described herein regarding the containers of the present disclosure. The primary container 370 can have a primary volume which is greater than the secondary volume. As shown, the primary container 370 and the secondary container 360 may comprise the same brand names 378 and 368, respectively. Independently or in conjunction therewith, the primary container 370 and secondary container 360 with liquid contents therein, may be made by or on behalf of the same manufacturer. For example, the primary container 370 may comprise the same brand name 378 as the secondary container 360; however, the primary container 370, with liquid contents therein may be made by contract manufacturer to the manufacturer of the secondary container 360 with liquid contents therein. As another example, both the primary container 370 and the secondary container 360 along with their liquid contents, may be made by one or more contract manufacturers for the same manufacturer.

It is contemplated that both the filled primary container 370 and filled secondary container 360 may be offered for sale in a store where the primary container 370 and secondary container 360 are positioned in general proximity to one another on a store shelf or multiple store shelves. However, it is also contemplated where the secondary containers 360 are offered either online or on store shelves, but where the primary containers 370 are offered only online.

As used herein, the term "array" means a display of container comprising liquid compositions which are the same or are similar. The containers within an "array" can have the same brand and/or sub-brand. An array is marketed as a line-up of products normally having like packaging elements (e.g., packaging material type, film, paper, dominant color, design theme, etc.) that convey to consumers that the different individual packages are part of a larger line-up. Arrays often have the same brand, for example, "Palmolive® Ultra," and can also have the same sub-brand. For example, under the brand "Palmolive® Ultra" for dishwashing liquid there are several sub-brands, i.e. "Ultra Strength," "Oxy," "Antibacterial," "Pure+Clear," and "Experientials." Within each of these sub-brands, there may be a variety of sizes.

Within an "array" are "intra-product arrays" which are a lineup of products which are designed for similar or the same functionality. For example, an "intra-product array" may comprise containers of a first dishwashing liquid and containers of a second dishwashing liquid. Each of the containers of first dishwashing liquid and containers of second dishwashing liquid are manufactured by and/or on behalf of the same manufacturer.

Additionally, the term "array" comprises "inter-product arrays" which are a line up of products which are designed for disparate functionality. As an example, an "inter-product array" may comprise containers of a dishwashing liquid composition and containers of a liquid laundry detergent. Each of the packages of the containers of dishwashing liquid and containers of liquid laundry detergent are manufactured by and/or on behalf of the same manufacturer. As another example, "inter-product array" may comprise containers of a dishwashing liquid, containers of liquid laundry detergent, and/or containers of liquid fabric enhancer. Each of the containers of dishwashing liquid, liquid laundry detergent, and/or liquid fabric enhancer are manufactured by and/or on behalf of the same manufacturer.

Both "inter-product arrays" and "intra-product arrays" may comprise the same brand name and/or the same sub-brand name. Or, both the "inter-product arrays" and the "intra-product arrays" may comprise different brand names.

The term "on-line array" means an "array" distributed by a common on-line source. And, the "array", much like the foregoing is manufactured by and/or on behalf of the same manufacturer.

The primary and secondary containers described herein may comprise an array of containers comprising liquid compositions. The array may be an intra-product array or an inter-product array. Additionally, the primary and secondary containers may be sold on-line and comprise an on-line array.

As noted previously, any suitable composition may be utilized in the containers of the present disclosure. Some examples include liquid dishwashing detergent, liquid laundry detergent, and liquid fabric enhancer. One particular example is a cleaning composition, specifically a hand dishwashing detergent. The hand dishwashing composition may be a liquid hand dishwashing detergent composition, aiming to be dispensed through the orifice of a liquid bottle or an inverted liquid container as described above. Alternatively, the hand dishwashing product may be a spray product.

Suitable inverted secondary containers are described in U.S. Pat. No. 10,611,531. Some in market examples utilizing such configurations include Dawn® Ultra EZ-Squeeze™, Dawn® Ultra Platinum EZ-Squeeze™, and Dawn® Ultra Antibacterial EZ-Squeeze™.

Suitable containers with spray capability are described in US2019/0232310, U.S. Pat. No. 10,328,447, and US2019/0232311. Some in market examples utilizing such configurations include Dawn® Ultra Platinum Powerwash™ Dish Spray, Dawn® Ultra Platinum Powerwash™ Dish Spray Apple Scent, Dawn® Ultra Platinum Powerwash™ Dish Spray Lemon Scent, Dawn® Ultra Platinum Powerwash™ Free & Clear, Dawn® Professional Power Dissolver, and Dawn® Professional Heavy Duty Degreaser. Other suitable containers include pouches. Some in market examples utilizing pouches include Tide™ original and Tide™ free & gentle. In such configurations, the cap of the present disclosure may be provided separately, or as mentioned previously, may be provided by a manufacturer that is different than that of the containers described herein. Pouches comprising liquid compositions therein are known in the art, as well as the method of making such pouches. In such configurations, the caps of the present disclosure may be removable and reusable as described herein.

It is worth noting that the caps of the present disclosure may have more flexibility regarding their positioning with respect to pouches. Pouches are more readily compressible than their more rigid container counterparts. For example, during dispensing of the liquid contents, less of a vacuum may be created due to the malleability of the pouch. The caps, i.e., the back edge of the elongated opening, of the present disclosure may be positioned more distal to a second longitudinal edge of a pouch than what is described herein. Still caps of the present disclosure may allow for an increased flow rate from pouches and thereby encourage and facilitate refilling of secondary containers.

Process

The containers of the present disclosure, both secondary and primary, may be made by processes known in the art. For example, the body portion of both the primary and secondary containers may be manufactured by injection blow molding or any other suitable process. Similarly, the caps of the present disclosure may be made by injection molding or any other suitable process.

Liquid Hand Dishwashing Composition

The liquid detergent composition according to the present disclosure may be a hand dishwashing detergent composition, more preferably a liquid hand dishwashing detergent composition, to be packaged in a pouch, bottle or inverted container as already described herein and dosed thereof through an orifice. The liquid hand-dishwashing detergent composition preferably is an aqueous cleaning composition, comprising from 50% to 90%, preferably from 60% to 75%, by weight of the total composition of water. Preferably the pH of the detergent composition of the invention, measured as a 10% product concentration in demineralized water at 20° C., is adjusted to between 3 and 14, more preferably between 4 and 13, more preferably between 6 and 12 and most preferably between 8 and 10.

Hand dishwashing liquids disposed within the containers of the present disclosure can be Newtonian or non-Newtonian, preferably Newtonian. Preferably these compositions are Newtonian in the usage shear rate range of from about 0.1 $s^{-1}$ to about 100 $s^{-1}$. Preferably, these compositions have a viscosity of from 10 mPa·s to 10,000 mPa·s, preferably from 100 mPa·s to 5,000 mPa·s, more preferably from 300 mPa·s to 2,000 mPa·s, or most preferably from 500 mPa·s to 1,500 mPa·s, alternatively combinations thereof. The viscosity is measured at 20° C. with a Brookfield RT Viscometer using spindle with the RPM of the viscometer adjusted to achieve a torque of between 40% and 60%.

The cleaning composition comprises from 5% to 50%, preferably from 8% to 45%, more preferably from 15% to 40%, by weight of the total composition of a surfactant system. The surfactant system preferably comprises from 60% to 90%, more preferably from 70% to 80% by weight of the surfactant system of an anionic surfactant. Alkyl sulphated anionic surfactants are preferred, particularly those selected from the group consisting of: alkyl sulphate, alkyl alkoxy sulphate preferably alkyl ethoxy sulphate, and mixtures thereof. The alkyl sulphated anionic surfactant preferably has an average alkyl chain length of from 8 to 18, preferably from 10 to 14, more preferably from 12 to 14, most preferably from 12 to 13 carbon atoms. The alkyl sulphated anionic surfactant preferably has an average degree of alkoxylation preferably ethoxylation, of less than 5, preferably less than 3, more preferably from 0.5 to 2.0, most preferably from 0.5 to 0.9. Alternatively, the alkyl sulphated anionic surfactant can be free of alkoxylation. The alkyl sulphated anionic surfactant preferably has a weight average degree of branching of more than 10%, preferably more than 20%, more preferably more than 30%, even more preferably between 30% and 60%, most preferably between 30% and 50%. Suitable counterions include alkali metal cation earth alkali metal cation, alkanolammonium or ammonium or substituted ammonium, but preferably sodium. Suitable examples of commercially available alkyl sulphate anionic surfactants include, those derived from alcohols sold under the Neodol® brand-name by Shell, or the Lial®, Isalchem®, and Safol® brand-names by Sasol, or some of the natural alcohols produced by The Procter & Gamble Chemicals company.

The surfactant system preferably comprises from 0.1% to 20%, more preferably from 0.5% to 15% and especially from 2% to 10% by weight of the liquid hand dishwashing detergent composition of a co-surfactant. Preferred co-surfactants are selected from the group consisting of an amphoteric surfactant, a zwitterionic surfactant, and mixtures thereof. The anionic surfactant to the co-surfactant weight ratio can be from 1:1 to 8:1, preferably from 2:1 to 5:1, more preferably from 2.5:1 to 4:1. The co-surfactant is preferably an amphoteric surfactant, more preferably an amine oxide surfactant. Preferably, the amine oxide surfactant is selected from the group consisting of: alkyl dimethyl amine oxide, alkyl amido propyl dimethyl amine oxide, and mixtures thereof, most preferably C12-C14 alkyl dimethyl amine oxide. Suitable zwitterionic surfactants include betaine surfactants, preferably cocamidopropyl betaine.

Preferably, the surfactant system of the composition of the present invention further comprises from 1% to 25%, preferably from 1.25% to 20%, more preferably from 1.5% to 15%, most preferably from 1.5% to 5%, by weight of the surfactant system, of a non-ionic surfactant. Suitable non-ionic surfactants can be selected from the group consisting of: alkoxylated non-ionic surfactant, alkyl polyglucoside ("APG") surfactant, and mixtures thereof. Suitable alkoxylated non-ionic surfactants can be linear or branched, primary or secondary alkyl alkoxylated preferably alkyl ethoxylated non-ionic surfactants comprising on average from 9 to 15, preferably from 10 to 14 carbon atoms in its alkyl chain and on average from 5 to 12, preferably from 6 to 10, most preferably from 7 to 8, units of ethylene oxide per mole of alcohol. Most preferably, the alkyl polyglucoside surfactant has an average alkyl carbon chain length between 10 and 16, preferably between 10 and 14, most preferably between 12 and 14, with an average degree of polymerization of between 0.5 and 2.5 preferably between 1 and 2, most preferably between 1.2 and 1.6. C8-C16 alkyl polyglucosides are commercially available from several suppliers (e.g., Simusol® surfactants from Seppic Corporation; and Glucopon® 600 CSUP, Glucopon® 650 EC, Glucopon® 600 CSUP/MB, and Glucopon® 650 EC/MB, from BASF Corporation).

The liquid hand dishwashing detergent composition herein may optionally comprise a number of other adjunct ingredients such as builders (e.g., preferably citrate), chelants (e.g., preferably GLDA), conditioning polymers, cleaning polymers including polyalkoxylated polyalkylene imines, surface modifying polymers, soil flocculating polymers, sudsing polymers including EO-PO-EO triblock copolymers, grease cleaning amines including cyclic polyamines, structurants, emollients, humectants, skin rejuvenating actives, enzymes, carboxylic acids, scrubbing particles, bleach and bleach activators, perfumes, malodor control agents, pigments, dyes, opacifiers, beads, pearlescent particles, microcapsules, organic solvents, inorganic cations such as alkaline earth metals such as Ca/Mg-ions, antibacterial agents, preservatives, viscosity adjusters (e.g., salt such as NaCl, and other mono-, di- and trivalent salts) and pH adjusters and buffering means (e.g. carboxylic acids such as citric acid, HCl, NaOH, KOH, alkanolamines, phosphoric and sulfonic acids, carbonates such as sodium carbonates, bicarbonates, sesquicarbonates, borates, silicates, phosphates, imidazole and alike). The composition comprises less than 10 ppm preferably less than 1 ppm of dioxane, alternatively is free of dioxane, especially 1,4-dioxane.

The composition may comprise traces of packaging additives such as plasticizers that may have migrated from the packaging into the liquid detergent composition upon ageing of the product. Similarly traces of components of the liquid detergent composition such as solvents or perfume may have migrated into the packaging material.

Liquid Hand Dishwashing Spray Compositions:

The liquid spray cleaning composition typically comprises an aqueous carrier in which all the other composition actives are dissolved or eventually dispersed. As such, water can be present in an amount of from 60% to 90%, preferably from 75% to 85% by weight of the composition.

Preferably the pH of the liquid hand dishwashing spray composition is greater than 8, more preferably from about 10 to about 12 and most preferably from about 10.5 to about 11.5, as measured at 20° C. on the neat product composition. Preferably, the liquid hand dishwashing spray composition has a reserve alkalinity of from about 0.1 to about 1, more preferably from about 0.1 to about 0.5 measured as detailed herein below.

Reserve alkalinity is defined as the grams of NaOH per 100 g of composition required to titrate the test composition at pH 10 to come to the test composition pH. The reserve alkalinity for a solution is determined in the following manner.

A PH meter (for example An Orion Model 720A) with a Ag/AgCl electrode (for example an Orion sure flow Electrode model 9172BN) is calibrated using standardized pH 7 and pH 10 buffers. A 100 g of a 10% solution in distilled water at 20° C. of the composition to be tested is prepared. The pH of the 10% solution is measured and the 100 g solution is titrated down to pH 10 using a standardized solution of 0.1 N of HCl. The volume of 0.1N HCl required is recorded in ml. The reserve alkalinity is calculated as follows:

Reserve Alkalinity=ml 0.1N HCl×0.1 (equivalent/liter)×Equivalent weight NaOH (g/equivalent)×10.

The liquid hand dishwashing spray cleaning product according to the present disclosure can comprise a composition having a Newtonian viscosity, such as from 1 mPa·s to 50 mPa·s, preferably from 1 mPa·s to 20 mPa·s, more preferably from 1 mPa·s to 10 mPa·s, at 20° C. as measured using the method defined herein. Alternatively the cleaning product according to the present disclosure can comprise a composition having a shear thinning rheology profile, such as having a high shear viscosity of from 1 mPa·s to 50 mPa·s, preferably from 1 mPa·s to 20 mPa·s, more preferably from 5 mPa·s to 15 mPa·s, when measured at a shear rate of at 1000 $s^{-1}$ at 20° C., and a low shear viscosity of from 100 mPa·s to 1,000 mPa·s, preferably from 200 mPa·s to 500 mPa·s, when measured at 0.1 $s^{-1}$ at 20° C., using the method defined herein. Preferably the cleaning composition of use in the present disclosure has a Newtonian viscosity. The method for determining viscosity is provided hereafter.

It is worth noting that where the liquid composition is a hand dishwashing liquid composition, the viscosity can be greater than where the liquid composition is a liquid hand dishwashing spray composition. The liquid compositions of the present disclosure may comprise a viscosity of from about 1 mPa·s to about 10,000 mPa·s, preferably from about 100 mPa·s to about 5,000 mPa·s, more preferably from 300 mPa·s to about 2,000 mPa·s, or most preferably from about 500 mPa·s to about 1,500 mPa·s, specifically including all values within these ranges and any ranges created thereby. However, it is believed that higher Newtonian viscosities, e.g., greater than 50 mPa·s, in a sprayer would make the liquid compositions overly difficult to dispense by a user. In contrast, users typically desire hand dishwashing liquid compositions to have a higher viscosity such that the liquid "sticks" to some extent on the surfaces to which the liquid composition is applied. Accordingly, the viscosities of the liquid compositions described herein may have the viscosities described herein depending on their application.

Additionally, where primary and secondary containers are provided, the liquid contents within each of the primary/second containers may be within the viscosity values described herein. The viscosity values of the liquid contents of the primary and secondary containers may be substantially equal. "Substantially equal" means taking into account measurement tolerances, the liquid compositions have the same viscosity.

Surfactant System

The liquid hand dishwashing spray composition comprises from 2% to 25%, preferably from 5% to 20%, more preferably from 8% to 15% by weight thereof of a surfactant system. The surfactant system may comprise an alkyl sulphate or an alkyl ethoxylated sulfate anionic surfactant, a co-surfactant preferably selected from the group consisting of amphoteric surfactants, zwitterionic surfactants, and mixtures thereof, and optionally a non-ionic surfactant. Alternatively, the surfactant system may comprise a non-ionic surfactant preferably an alkyl polyglucoside non-ionic surfactant, and a co-surfactant preferably selected from the group consisting of amphoteric surfactants, zwitterionic surfactants, and mixtures thereof, wherein the composition preferably comprises less than 3% by weight of the composition more preferably is free of anionic surfactant. Preferably, the co-surfactant is an amphoteric surfactant wherein the amphoteric co-surfactant is an amine oxide co-surfactant.

Preferably, the anionic alkyl sulfate or alkyl ethoxylated sulfate surfactant, or the alkyl polyglucoside surfactant, and the co-surfactant are present in the composition of the invention in a weight ratio of 10:1 to 1:2 preferably from 5:1 to 1:1.5 most preferably from 3:1 to 1:1.

When formulating an anionic surfactant alkyl ethoxy sulfates with an average degree of ethoxylation from about 2 to about 5, most preferably about 3 are preferred for use herein.

Alkyl Sulfated Anionic Surfactant

A preferred sulfated anionic surfactant is an alkoxylate, more preferably, an alkoxylate sulfate anionic surfactant. Preferably, the alkoxy group is ethoxy. Alkyl sulphated anionic surfactants are preferred, particularly those selected from the group consisting of: alkyl sulphate, alkyl alkoxy sulphate preferably alkyl ethoxy sulphate, and mixtures thereof. The alkyl sulphated anionic surfactant preferably has an average alkyl chain length of from 8 to 18, preferably from 10 to 14, more preferably from 12 to 14, most preferably from 12 to 13 carbon atoms. The alkyl sulphated anionic surfactant preferably has an average degree of alkoxylation preferably ethoxylation, of less than or equal to 5, preferably from 2 to 5, most preferably about 3. The alkyl sulphate anionic surfactant preferably has a weight average degree of branching of more than 10%, preferably more than 20%, more preferably more than 30%, even more preferably between 30% and 60%, most preferably between 30% and 50%. Suitable counterions include alkali metal cation earth alkali metal cation, alkanolammonium or ammonium or substituted ammonium, but preferably sodium. Suitable examples of commercially available alkyl sulphate anionic surfactants include, those derived from alcohols sold under the Neodol® brand-name by Shell, or the Lial®, Isalchem®, and Safol® brand-names by Sasol, or some of the natural alcohols produced by The Procter & Gamble Chemicals company.

Alkyl Polyglucoside Surfactant:

The surfactant system preferably comprises the alkyl polyglucoside ("APG") at a level of from 2.0% to 12%, preferably from 2.5% to 10%, more preferably from 3.0% to 7.5% by weight of the composition. For improved crystalline grease removal, the alkyl polyglucoside surfactant can have a number average alkyl carbon chain length between 8 and 18, preferably between 10 and 16, most preferably between 12 and 14, with an average degree of polymerization of between 0.1 and 3.0 preferably between 1.0 and 2.0, most preferably between 1.2 and 1.6. For improved initial sudsing, the alkyl polyglucoside surfactant can have a number average alkyl carbon chain length between 8 and 18, preferably between 8 and 14, most preferably between 8 and 10, with an average degree of polymerization of between 0.1 and 3.0 preferably between 1.0 and 2.0, most preferably between 1.2 and 1.6. C8-C18 alkyl polyglucosides are commercially available from several suppliers (e.g., Simusol® surfactants from Seppic Corporation; and Glucopon® 600 CSUP, Glucopon® 650 EC, Glucopon® 600 CSUP/MB, and Glucopon® 650 EC/MB, from BASF Corporation).

Amphoteric Surfactant

Preferably the amphoteric surfactant is an amine oxide. Preferred amine oxides are alkyl dimethyl amine oxide or alkyl amido propyl dimethyl amine oxide, more preferably alkyl dimethyl amine oxide and especially coco dimethyl amino oxide or the C12-C14 alkyl fraction thereof.

Amine oxide may have a linear or mid-branched alkyl moiety. Typical linear amine oxides include water-soluble amine oxides containing one R1 C8-18 alkyl moiety and 2 R2 and R3 moieties selected from the group consisting of C1-3 alkyl groups and C1-3 hydroxyalkyl groups. Preferably amine oxide is characterized by the formula R1-N(R2)(R3)O wherein R1 is a C8-18 alkyl and R2 and R3 are selected from the group consisting of methyl, ethyl, propyl, isopropyl, 2-hydroxethyl, 2-hydroxypropyl and 3-hydroxypropyl. The linear amine oxide surfactants in particular may include linear C10-C18 alkyl dimethyl amine oxides and linear C8-C12 alkoxy ethyl dihydroxy ethyl amine oxides. Preferred amine oxides include linear C10, linear C10-C12, and linear C12-C14 alkyl dimethyl amine oxides. As used herein "mid-branched" means that the amine oxide has one alkyl moiety having n1 carbon atoms with one alkyl branch on the alkyl moiety having n2 carbon atoms. The alkyl branch is located on the a carbon from the nitrogen on the alkyl moiety. This type of branching for the amine oxide is also known in the art as an internal amine oxide. The total sum of n1 and n2 is from 10 to 24 carbon atoms, preferably from 12 to 20, and more preferably from 10 to 16. The number of carbon atoms for the one alkyl moiety (n1) should be approximately the same number of carbon atoms as the one alkyl branch (n2) such that the one alkyl moiety and the one alkyl branch are symmetric. As used herein "symmetric" means that |n1−n2| is less than or equal to 5, preferably 4, most preferably from 0 to 4 carbon atoms in at least 50 wt %, more preferably at least 75 wt % to 100 wt % of the mid-branched amine oxides for use herein.

The amine oxide further comprises two moieties, independently selected from a C1-3 alkyl, a C1-3 hydroxyalkyl group, or a polyethylene oxide group containing an average of from about 1 to about 3 ethylene oxide groups. Preferably the two moieties are selected from a C1-3 alkyl, more preferably both are selected as a C1 alkyl.

Zwitterionic Surfactant

Other suitable surfactants include zwitterionic surfactants, preferably betaines, such as alkyl betaines, alkylamidobetaine, amidazoliniumbetaine, sulfobetaine (INCI Sultaines) as well as the Phosphobetaine and preferably meets formula (I):

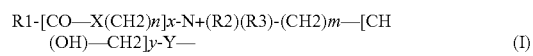

wherein R1 is a saturated or unsaturated C6-22 alkyl residue, preferably C8-18 alkyl residue, in particular a saturated C10-16 alkyl residue, for example a saturated C12-14 alkyl residue; X is NH, NR4 with C1-4 Alkyl residue R4, O or S; n a number from 1 to 10, preferably 2 to 5, in particular 3; x is 0 or 1, preferably 1; R2, R3 are independently a C1-4 alkyl residue, potentially hydroxy substituted such as a hydroxyethyl, preferably a methyl; m a number from 1 to 4, in particular 1, 2 or 3; y is 0 or 1 and Y is COO, SO3, OPO(OR5)O or P(O)(OR5)O, whereby R5 is a hydrogen atom H or a C1-4 alkyl residue.

Preferred betaines are the alkyl betaines of the formula (Ia), the alkyl amido propyl betaine of the formula (Ib), the Sulfo betaines of the formula (Ic) and the Amido sulfobetaine of the formula (Id);

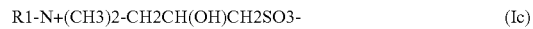

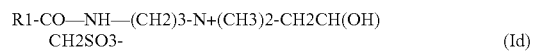

in which R1 has the same meaning as in formula I.

Particularly preferred betaines are the Carbobetaine [wherein Y——COO—], in particular the Carbobetaine of the formula (Ia) and (Ib), more preferred are the Alkylamidobetaine of the formula (Ib). Examples of suitable betaines and sulfobetaine are the following [designated in accordance with INCI]: Almondamidopropyl of betaines, Apricotam idopropyl betaines, Avocadamidopropyl of betaines, Babassuamidopropyl of betaines, Behenam idopropyl betaines, Behenyl of betaines, betaines, Canolam idopropyl betaines, Capryl/Capram idopropyl betaines, Carnitine, Cetyl of betaines, Cocamidoethyl of betaines, Cocam idopropyl betaines, Cocam idopropyl Hydroxysultaine, Coco betaines, Coco Hydroxysultaine, Coco/Olcam idopropyl betaines, Coco Sultaine, Decyl of betaines, Dihydroxyethyl Oleyl Glycinate, Dihydroxyethyl Soy Glycinate, Dihydroxyethyl Stearyl Glycinate, Dihydroxyethyl Tallow Glycinate, Dimethicone Propyl of PG-betaines, Erucam idopropyl Hydroxysultaine, Hydrogenated Tallow of betaines, Isostearam idopropyl betaines, Lauram idopropyl betaines, Lauryl of betaines, Lauryl Hydroxysultaine, Lauryl Sultaine, Milkam idopropyl betaines, Minkamidopropyl of betaines, Myristam idopropyl betaines, Myristyl of betaines, Olcam idopropyl betaines, Olcam idopropyl Hydroxysultaine, Olcyl of betaines, Olivamidopropyl of betaines, Palmam idopropyl betaines, Palm itam idopropyl betaines, Palmitoyl Carnitine, Palm Kernelam idopropyl betaines, Polytetrafluoroethylene Acetoxypropyl of betaines, Ricinoleam idopropyl betaines, Sesam idopropyl betaines, Soyam idopropyl betaines, Stearam idopropyl betaines, Stearyl of betaines, Tallowam idopropyl betaines, Tallowam idopropyl Hydroxysultaine, Tallow of betaines, Tallow Dihydroxyethyl of betaines, Undecylenam idopropyl betaines and Wheat Germam idopropyl betaines.

A preferred betaine is, for example, Cocoamidopropyl-betaine.

Further Non-Ionic Surfactant:

The surfactant system can comprise further non-ionic surfactant. If present, the surfactant system can comprise from 0.5% to 10%, preferably from 1.0% to 5.0%, more preferably from 1.5% to 3.0% by weight of the composition of the further nonionic surfactant.

Suitable further non-ionic surfactants include alkyl alkoxylated non-ionic surfactants, more preferably ethoxylated non-ionic surfactants. Suitable nonionic surfactants include the condensation products of aliphatic alcohols with from 1 to 25 moles of ethylene oxide. The alkyl chain of the aliphatic alcohol can either be straight or branched, primary or secondary, preferably straight.

The further nonionic surfactant is preferably a low-cut alkyl ethoxylate surfactant. Low cut alcohol ethoxylate surfactants include alcohol ethoxylate surfactants with an average alkyl carbon chain length of C10 and below. More preferably the alkyl ethoxylate surfactant has an average alkyl chain length of between C5 to C8, preferably between C5 to C7, and a number average degree of ethoxylation of from 1 to 10, preferably from 3 to 8, more preferably from 4 to 6. Suitable non-ionic alcohol ethoxylate surfactants include commercially available materials such as Emulan® HE50 or Lutensol® CS6250 (available from BASF).

Other suitable non-ionic surfactants for use herein can be selected from fatty alcohol polyglycol ethers, fatty acid glucamides, and mixtures thereof.

A preferred surfactant system for the detergent composition of the present invention comprises preferably consists of: (1) 4% to 10%, preferably 5% to 8% by weight of the composition of an alkyl ethoxylated sulfate anionic surfactant; (2) 1% to 5%, preferably from 1% to 4% by weight of the composition of a surfactant selected from the group consisting of amphoteric surfactant, zwitterionic surfactant and mixtures thereof, preferably an amine oxide co-surfactant, and (3) from 1.5% to 6.0% of a low cut alcohol ethoxylate nonionic surfactant, preferably having an average alkyl chain length of between C5 and C7 and a number average degree of ethoxylation of from 4 to 6.

Another preferred surfactant system comprises preferably consists of i) from 3.0 to 7.5% of an alkyl polyglucoside surfactant, preferably having an average alkyl chain length between 12 and 14 and an average degree of polymerization of between 1.2 and 1.6, ii) 2.0 to 4.0% of an amine oxide surfactant, preferably a C12-C14 dimethyl amine oxide surfactant, and iii) from 1.5% to 6.0% of a low cut alcohol ethoxylate nonionic surfactant, preferably having an average alkyl chain length of between C5 and C7 and a number average degree of ethoxylation of from 4 to 6. Such surfactant systems in combination with the glycol ethers described below can provide excellent cleaning and good foaming profile.

The liquid spray detergent composition could optionally comprise a cationic surfactant, preferably a quaternary ammonium type cationic surfactant.

Glycol Ether Solvent

The composition of the invention preferably comprises a glycol ether solvent selected from glycol ethers of Formula I or Formula II.

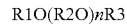  Formula I:

Wherein R1 is a linear or branched C4, C5 or C6 alkyl, a substituted or unsubstituted phenyl, preferably n-butyl. Benzyl is one of the substituted phenyls for use herein; R2 is ethyl or isopropyl, preferably isopropyl; R3 is hydrogen or methyl, preferably hydrogen; n is 1, 2 or 3, preferably 1 or 2.

  Formula II:

Wherein R4 is n-propyl or isopropyl, preferably n-propyl; R5 is isopropyl; R6 is hydrogen or methyl, preferably hydrogen; n is 1, 2 or 3 preferably 1 or 2.

Suitable glycol ether solvents according to Formula I include ethyleneglycol n-butyl ether, diethyleneglycol n-butyl ether, triethyleneglycol n-butyl ether, propyleneglycol n-butyl ether, dipropyleneglycol n-butyl ether, tripropyleneglycol n-butyl ether, ethyleneglycol n-pentyl ether, diethyleneglycol n-pentyl ether, triethyleneglycol n-pentyl ether, propyleneglycol n-pentyl ether, dipropyleneglycol n-pentyl ether, tripropyleneglycol n-pentyl ether, ethyleneglycol n-hexyl ether, diethyleneglycol n-hexyl ether, triethyleneglycol n-hexyl ether, propyleneglycol n-hexyl ether, dipropyleneglycol n-hexyl ether, tripropyleneglycol n-hexyl ether, ethyleneglycol phenyl ether, diethyleneglycol phenyl ether, triethyleneglycol phenyl ether, propyleneglycol phenyl ether, dipropyleneglycol phenyl ether, tripropyleneglycol phenyl ether, ethyleneglycol benzyl ether, diethyleneglycol benzyl ether, triethyleneglycol benzyl ether, propyleneglycol benzyl ether, dipropyleneglycol benzyl ether, tripropyleneglycol benzyl ether, ethyleneglycol isobutyl ether, diethyleneglycol isobutyl ether, triethyleneglycol isobutyl ether, propyleneglycol isobutyl ether, dipropyleneglycol isobutyl ether, tripropyleneglycol isobutyl ether, ethyleneglycol isopentyl ether, diethyleneglycol isopentyl ether, triethyleneglycol isopentyl ether, propyleneglycol isopentyl ether, dipropyleneglycol isopentyl ether, tripropyleneglycol isopentyl ether, ethyleneglycol isohexyl ether, diethyleneglycol isohexyl ether, triethyleneglycol isohexyl ether, propyleneglycol isohexyl ether, dipropyleneglycol isohexyl ether, tripropyleneglycol isohexyl ether, ethyleneglycol n-butyl methyl ether, diethyleneglycol n-butyl methyl ether triethyleneglycol n-butyl methyl ether, propyleneglycol n-butyl methyl ether, dipropyleneglycol n-butyl methyl ether, tripropyleneglycol n-butyl methyl ether, ethyleneglycol n-pentyl methyl ether, diethyleneglycol n-pentyl methyl ether, triethyleneglycol n-pentyl methyl ether, propyleneglycol n-pentyl methyl ether, dipropyleneglycol n-pentyl methyl ether, tripropyleneglycol n-pentyl methyl ether, ethyleneglycol n-hexyl methyl ether, diethyleneglycol n-hexyl methyl ether, triethyleneglycol n-hexyl methyl ether, propyleneglycol n-hexyl methyl ether, dipropyleneglycol n-hexyl methyl ether, tripropyleneglycol n-hexyl methyl ether, ethyleneglycol phenyl methyl ether, diethyleneglycol phenyl methyl ether, triethyleneglycol phenyl methyl ether, propyleneglycol phenyl methyl ether, dipropyleneglycol phenyl methyl ether, tripropyleneglycol phenyl methyl ether, ethyleneglycol benzyl methyl ether, diethyleneglycol benzyl methyl ether, triethyleneglycol benzyl methyl ether, propyleneglycol benzyl methyl ether, dipropyleneglycol benzyl methyl ether, tripropyleneglycol benzyl methyl ether, ethyleneglycol isobutyl methyl ether, diethyleneglycol isobutyl methyl ether, triethyleneglycol isobutyl methyl ether, propyleneglycol isobutyl methyl ether, dipropyleneglycol isobutyl methyl ether, tripropyleneglycol isobutyl methyl ether, ethyleneglycol isopentyl methyl ether, diethyleneglycol isopentyl methyl ether, triethyleneglycol isopentyl methyl ether, propyleneglycol isopentyl methyl ether, dipropyleneglycol isopentyl methyl ether, tripropyleneglycol isopentyl methyl ether, ethyleneglycol isohexyl methyl ether, diethyleneglycol isohexyl methyl ether, triethyleneglycol isohexyl methyl ether, propyleneglycol isohexyl methyl ether, dipropyleneglycol isohexyl methyl ether, tripropyleneglycol isohexyl methyl ether, and mixtures thereof.

Preferred glycol ether solvents according to Formula I are ethyleneglycol n-butyl ether, diethyleneglycol n-butyl ether, triethyleneglycol n-butyl ether, propyleneglycol n-butyl ether, dipropyleneglycol n-butyl ether, tripropyleneglycol n-butyl ether, and mixtures thereof.

Most preferred glycol ethers according to Formula I are propyleneglycol n-butyl ether, dipropyleneglycol n-butyl ether, and mixtures thereof.

Suitable glycol ether solvents according to Formula II include propyleneglycol n-propyl ether, dipropyleneglycol n-propyl ether, tripropyleneglycol n-propyl ether, propyleneglycol isopropyl ether, dipropyleneglycol isopropyl ether, tripropyleneglycol isopropyl ether, propyleneglycol n-propyl methyl ether, dipropyleneglycol n-propyl methyl ether, tripropyleneglycol n-propyl methyl ether, propyleneglycol isopropyl methyl ether, dipropyleneglycol isopropyl methyl ether, tripropyleneglycol isopropyl methyl ether, and mixtures thereof.

Preferred glycol ether solvents according to Formula II are propyleneglycol n-propyl ether, dipropyleneglycol n-propyl ether, and mixtures thereof.

Most preferred glycol ether solvents are propyleneglycol n-butyl ether, dipropyleneglycol n-butyl ether, and mixtures thereof, especially dipropyleneglycol n-butyl ether.

Suitable glycol ether solvents can be purchased from The Dow Chemical Company, more particularly from the E-series (ethylene glycol based) Glycol Ethers and the P-series (propylene glycol based) Glycol Ethers line-ups. Suitable glycol ether solvents include Butyl Carbitol, Hexyl Carbitol, Butyl Cellosolve, Hexyl Cellosolve, Butoxytriglycol, Dowanol Eph, Dowanol PnP, Dowanol DPnP, Dowanol PnB, Dowanol DPnB, Dowanol TPnB, Dowanol PPh, and mixtures thereof.

The glycol ether of the product of the invention can boost foaming. The glycol ether solvent typically is present from about 1% to about 10%, preferably from about 2 to about 8%, most preferably from about 3% to about 7% by weight of the composition. Preferably the surfactant system and the glycol ether system are present in a relative weight ratio of from 5:1 to 1:5, preferably from 3:1 to 1:3.

Further Optional Ingredients

The composition herein may comprise a number of optional ingredients such as chelants such as aminocarboxylate or aminophosphonate chelants preferably GLDA, builders preferably carboxylate builders such as citric acid, rheology trimming agents selected from inorganic salts preferably sodium chloride, C2-C4 alcohols, C2-C4 polyols, poly alkylene glycols, hydrotropes, and mixtures thereof. Alternatively, the composition may include a shear thinning rheology modified, preferably xanthan gum. The composition might also comprise pH trimming and/or buffering agents such as sodium hydroxyde, alkanolamines including monoethanolamine, and bicarbonate inorganic salts. The composition might comprise further minor ingredients selected from preservatives, UV stabilizers, antioxidants, perfumes, coloring agents and mixtures thereof. The composition comprises less than 10 ppm preferably less than 1 ppm of dioxane, alternatively is free of dioxane, especially 1,4-dioxane.

The composition may comprise traces of packaging additives such as plasticizers that may have migrated from the spray packaging into the liquid detergent composition upon ageing of the product. Similarly traces of components of the liquid detergent composition such as solvents or perfume may have migrated into the spray packaging material.

EXAMPLES

The following are exemplary liquid hand dishwashing detergent formulations to be enclosed in liquid bottles (Table 1) respectively liquid spray containers (Table 2). The formulation can be made through standard mixing of the individual components."

TABLE 1

Liquid hand dishwashing detergent composition

| As 100% active | Ex 1 | Ex 2 | Ex 3 | Ex 4 | Ex 5 | Ex 6 |
| --- | --- | --- | --- | --- | --- | --- |
| C12-C13AE0.6S anionic surfactant (Avg. branching: 37.84%) | 19.6 | — | 18.0 | — | 11.6 | 9.5 |
| C12-C13AS (avg branching: 30.40%) | — | 19.4 | — | 15.0 | — | — |
| C12-C14 dimethyl amine oxide | 6.5 | 8.2 | — | — | 4.1 | 4.7 |
| Cocoamidopropylbetaine | — | — | 6.0 | 5.0 | — | — |
| Alcohol ethoxylate nonionic surfactant (Neodol 91/8) | 1.0 | 4.0 | 2.0 | 3.0 | — | 7.1 |

TABLE 1-continued

Liquid hand dishwashing detergent composition

| As 100% active | Ex 1 | Ex 2 | Ex 3 | Ex 4 | Ex 5 | Ex 6 |
|---|---|---|---|---|---|---|
| APG Glucopon 600 CSUP | — | — | — | — | — | 7.1 |
| Alkoxylated polyethyleneimine (PEI600EO24PO16) | 0.2 | 0.6 | — | — | — | — |
| Baxxodur ECX210 | 0.25 | — | — | — | 0.04 | 0.2 |
| GLDA chelant | — | 0.6 | 0.2 | 0.5 | — | — |
| ethanol | 2.4 | 2.2 | 2.0 | 1.5 | — | 3.1 |
| NaCl | 0.7 | 0.7 | 0.5 | 0.6 | 0.6 | — |
| MgCl2 | — | — | — | — | — | 0.2 |
| Sodium citrate | — | 0.5 | — | 0.25 | — | — |
| MgSO4 | 0.06 | — | — | — | 0.01 | — |
| Polypropyleneglycol (MW2000) | 0.9 | 0.2 | 1.0 | 0.4 | 0.5 | 0.4 |
| Sodium cumene sulphonate | — | — | — | — | — | 2.2 |
| Tergitol L64 | — | — | — | — | — | 0.5 |
| Water + Minor ingredients (perfume, dye, preservatives) | Balance to 100 | Balance to 100 | Balance to 100 | Balance to 100 | Balance to 100 | Balance to 100 |
| pH (at 10% product concentration in demineralized water - with NaOH trimming) | 9.0 | 9.2 | 8.5 | 8.0 | 9.2 | 7.5 |

TABLE 2

Liquid hand dishwashing spray detergent compositions

| As 100% active | Ex 7 | Ex 8 | Ex 9 | Ex 10 | Ex 11 |
|---|---|---|---|---|---|
| C12 to C14 APG (Glucopon ® 600) | 6.54 | — | 6.54 | — | — |
| C8 to C10 APG (Glucopon ® 215) | — | 6.54 | — | — | — |
| C12-14AE3S anionic surfactant | — | — | — | 6.54 | 6.54 |
| C12-14 dimethylamine oxide | 2.46 | 2.46 | — | 2.46 | — |
| Cocoamidopropyl betaine | — | — | 2.46 | — | 2.46 |
| C6EO5 nonionic surfactant (Lutensol CS6250) | 5.00 | 4.00 | 6.00 | 5.00 | 4.00 |
| Monoethanolamine | 0.50 | 0.50 | 0.50 | 0.50 | 0.50 |
| GLDA chelant | 1.00 | 0.75 | 0.50 | 1.00 | 1.00 |
| Citric acid | 0.12 | 0.12 | 0.12 | 0.12 | 0.12 |
| PPG (MW 2000) | 0.05 | 0.05 | 0.05 | 0.05 | 0.05 |
| ethanol | 0.34 | 0.34 | 0.34 | 0.34 | 0.34 |
| Dowanol DPnB glycol ether solvent | 5.00 | 4.00 | 6.00 | 5.00 | 5.00 |
| phenoxyethanol | 0.30 | 0.30 | 0.30 | 0.30 | 0.30 |
| perfume | 0.35 | 0.35 | 0.35 | 0.35 | 0.35 |
| Water and optional dyes | Balance to 100 | Balance to 100 | Balance to 100 | Balance to 100 | Balance to 100 |
| pH (neat) | 11.0 | 11.5 | 8.5 | 11.0 | 9.0 |

The caps of the present disclosure were evaluated regarding flow rate. The results are shown below. The data in Table 3 shows a comparison with the angles between the inventive example and the conventional example being the same. The data provided in Table 3 was produced via hand pouring the examples into a secondary container as described herein. The data regarding Tables 4, 5, and 6 was obtained utilizing a Cobot Robotic Arm with load programs created to simulate the act of pouring liquid from a container where the pour angle is 84 degrees for 20 seconds, 108 degrees for 15 seconds, and 120 degrees for 25 seconds, performed serially. The pouring of liquid was into a cut-off 5-gallon bucket.

Example A is an inventive sample comprising a bottle as shown in FIG. 1A, in the 90 oz. size, and as described herein as well as a cap as described herein. The viscosity of liquid in the container of Example A was 1165 centipoise.

Example B is an inventive sample comprising the bottle and cap of Example A but with a liquid having a viscosity of 797 centipoise, i.e., Ajax™ liquid dish soap.

Example C is an inventive sample comprising the bottle and cap of Example A but with a liquid having a viscosity of 4.97 centipoise.

Comparative Example 1 is a conventional example including a commercially available 90 oz. bottle with no cap. The diameter of the opening was 20.75 mm. The viscosity of the liquid in the container of Comparative Example 1 was 1165 centipoise.

Comparative Example 2 is a commercially available dish detergent, i.e. Ajax™, available in a 90 oz. sized container having a neck opening diameter of 24.5 mm. The viscosity of the liquid in the container of Comparative Example 2 was 797 centipoise.

Comparative Example 3 comprises the bottle of Comparative Example 1 with no cap. The viscosity of the liquid within the bottle was 4.97 centipoise.

TABLE 3

| | Example A N = 5 | | | Comparative Example 1 N = 5 | | | |
|---|---|---|---|---|---|---|---|
| % Full Bottle | Avg Angle (degrees) | Avg Flow Rate (ml/min) | Avg Flow Rate (ml/sec) | Avg Angle (degrees) | Avg Flow Rate (ml/min) | Avg Flow Rate (ml/sec) | Change in Flow Rate (%) |
| 100% | 84 | 1583 | 26.4 | 84 | 1323 | 22.0 | 19.7% |
| 50% | 108 | 3313 | 55.2 | 108 | 2138 | 35.6 | 55.0% |
| 25% | 120 | 1728 | 28.8 | 120 | 1065 | 17.8 | 62.2% |

Figure 4:
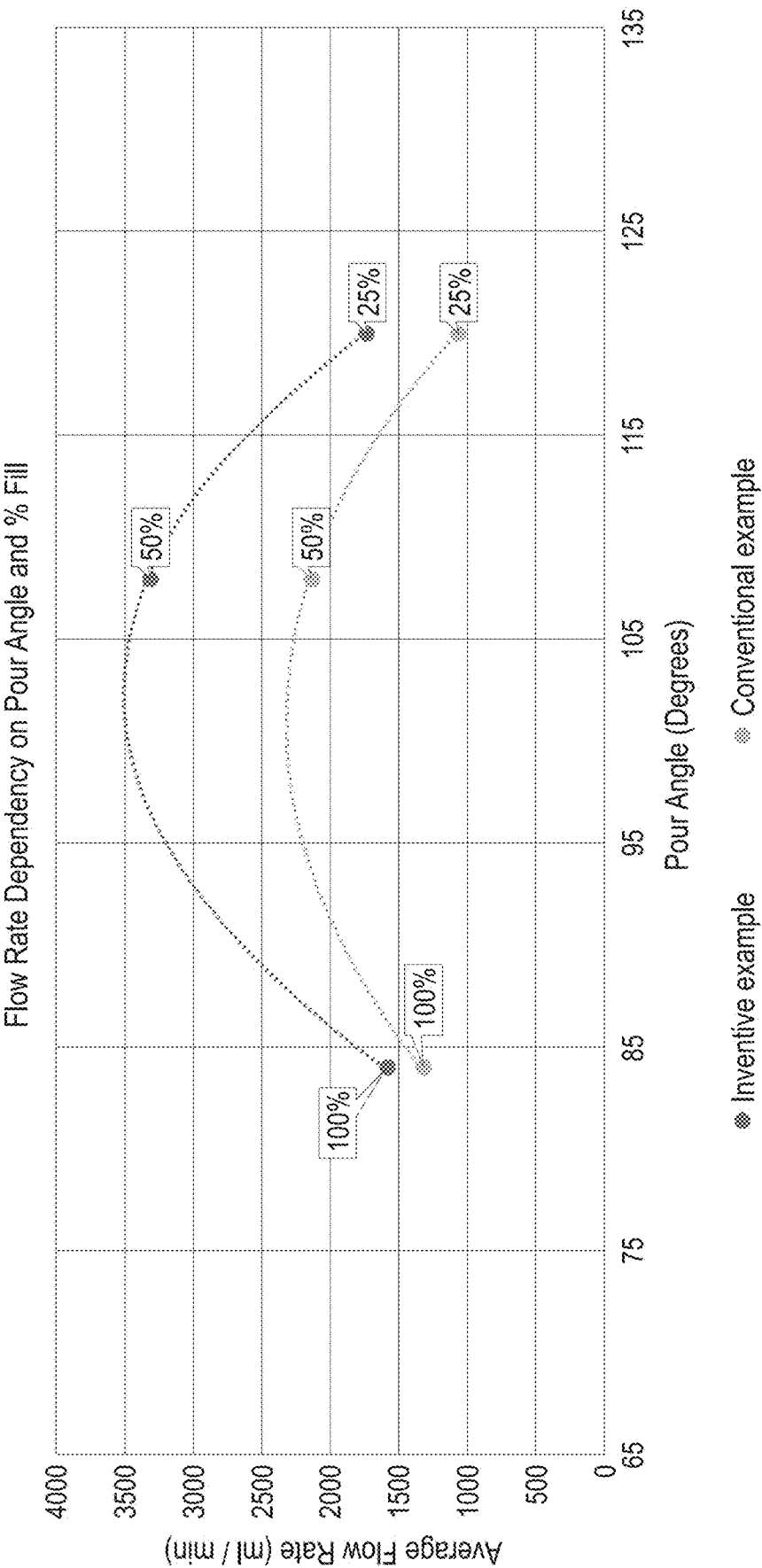
FIG. 4 is a graph showing pour angles relative to fill levels and flow rates for inventive and a comparative example.

FIG. 4 shows that regardless of fill level, shows that the resulting flow rate was better for Example A at all pour angles than that of Comparative Example 1.

Additional testing was performed regarding Example A and Comparative Example 1, wherein the liquid had a viscosity of 1165 centipoise.

TABLE 4

| | Example A N = 3 | | | Comparative Example 1 N = 3 | | | |
|---|---|---|---|---|---|---|---|
| % Full Bottle | Avg Angle (degrees) | Avg Flow Rate (ml/min) | Avg Flow Rate (ml/sec) | Avg Angle (degrees) | Avg Flow Rate (ml/min) | Avg Flow Rate (ml/sec) | Change in Flow Rate (%) |
| 100% | 84 | 1883.82 | 31.4 | 84 | 886.35 | 14.8 | 112.5% |
| 50% | 108 | 3024.82 | 50.4 | 108 | 1885.9 | 31.4 | 60.4% |
| 25% | 120 | 1113.29 | 18.6 | 120 | 876.96 | 14.6 | 26.9% |

Figure 5:
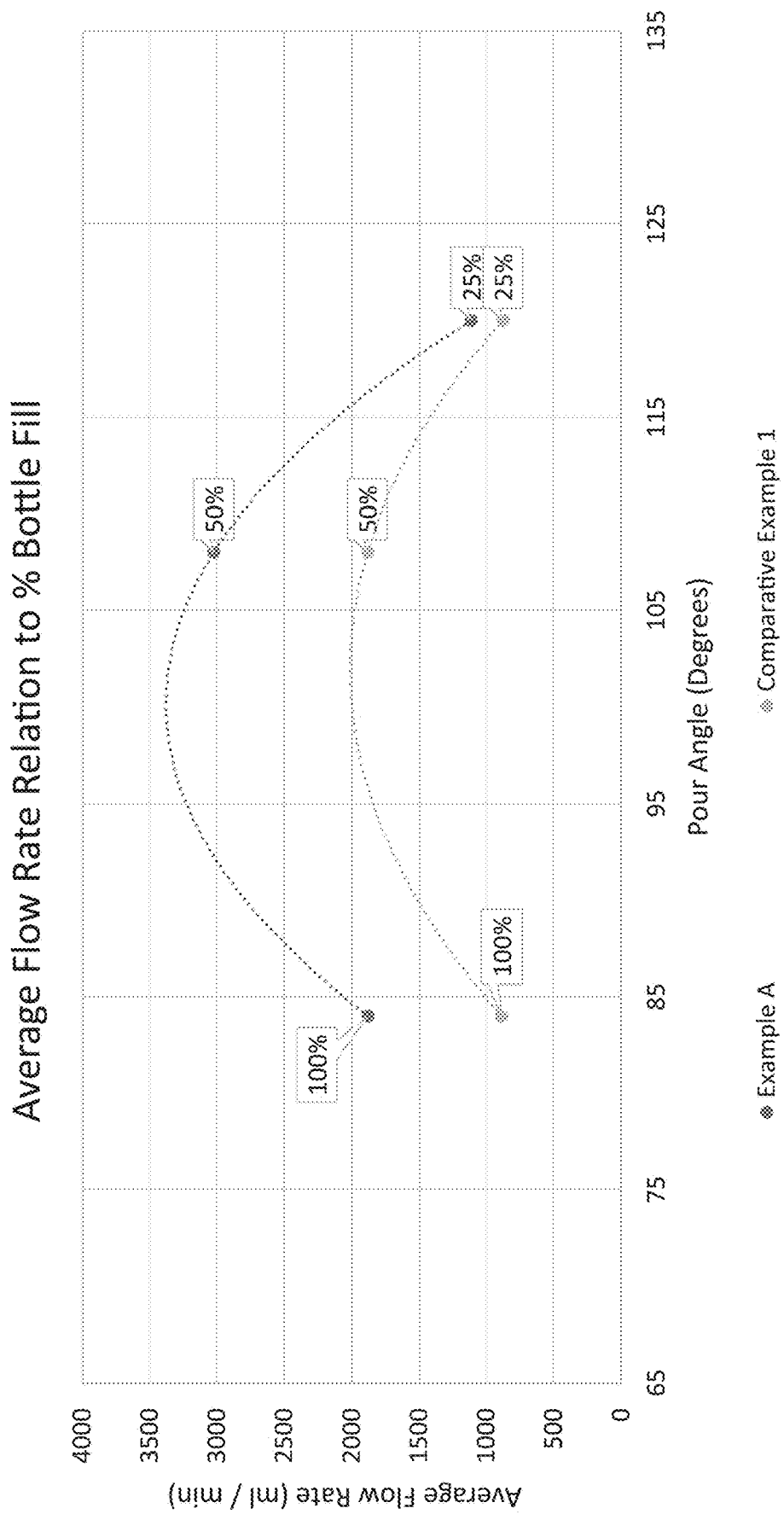
FIG. 5 is a graph showing pour angles relative to fill levels and flow rates for inventive and a comparative example.

The results of the above testing are shown in FIG. 5. Much like FIG. 4, FIG. 5 demonstrates that Example A allows for a much higher flow rate of liquid from the container than does Comparative Example 1 at all of the pour angles tested.

Additional testing was performed between Example B and Comparative Example 2. The data below was obtained via the same process as that utilized for the data in Table 4.

TABLE 5

| | Example B N = 3 | | | Comparative Example 2 N = 3 | | | |
|---|---|---|---|---|---|---|---|
| % Full Bottle | Avg Angle (degrees) | Avg Flow Rate (ml/min) | Avg Flow Rate (ml/sec) | Avg Angle (degrees) | Avg Flow Rate (ml/min) | Avg Flow Rate (ml/sec) | Change in Flow Rate (%) |
| 100% | 84 | 2060.47 | 34.3 | 84 | 2521.71 | 42.0 | -18.3% |
| 50% | 108 | 3303.62 | 55.1 | 108 | 3438.50 | 57.3 | -3.9% |
| 25% | 120 | 1113.69 | 18.9 | 120 | 1169.82 | 19.5 | -2.8% |

While the flow rate of the Comparative Example 2 was slightly faster than the inventive example, it is worth noting that the opening for the Comparative Example 2 was 471.4 mm² which was about 26 percent larger area than that of the Example B. With the larger opening, while faster flow rates may be able to be achieved, it may also be more difficult to control during refill. For example, a wider opening pouring into a smaller opening can lead to increased spillage during the refill process—this is particularly the case where increased glugging occurs. And in this case, substantially more glugging was observed during testing for Comparative Example 2 than that of Example B. The fact that more glugging was observed regarding Comparative Example 2 versus that of Example B, demonstrates that the caps of the present disclosure provide a benefit to reduce glugging regardless of the viscosity of the liquid within the container upon which the cap is provided. The reduced glugging also allows for much broader control of the liquid being poured from a bottle.

Additional testing was performed between Example C and Comparative Example 3. The data below was obtained via the same process as that utilized for the data in Tables 4 and 5.

TABLE 6

| | Example C N = 3 | | | Comparative Example 3 N = 3 | | | |
|---|---|---|---|---|---|---|---|
| % Full Bottle | Avg Angle (degrees) | Avg Flow Rate (ml/min) | Avg Flow Rate (ml/sec) | Avg Angle (degrees) | Avg Flow Rate (ml/min) | Avg Flow Rate (ml/sec) | Change in Flow Rate (%) |
| 100% | 84 | 2675.8 | 44.6 | 84 | 1955.4 | 32.6 | 36.8% |
| 50% | 108 | 4004.2 | 66.7 | 108 | 3215.1 | 53.6 | 24.5% |
| 25% | 120 | 1314.0 | 21.9 | 120 | 1202.7 | 20.0 | 9.3% |

As is shown, the inventive examples demonstrate high flow rates, and in many instances increased flow rates, over their conventional counterparts. Additionally, the inventive examples exhibited less glugging than their conventional counterparts. Less glugging can reduce the likelihood of spillage during refill which can encourage users to refill more often which can in turn reduce the amount of material provided to landfills.

Additionally, the data shows that the caps of the present disclosure have a much more pronounced effect on flow rate for liquids having a higher viscosity, e.g. 1000 centipoise or greater. With the decrease in viscosity, the increased flow rate benefit may be less than that demonstrated with higher viscosity liquids, but the reduced glugging benefit is still present.

Contemplated Examples

Example A1: A container comprising a liquid composition therein, the container further comprising:

a body portion; a neck disposed on the body portion, the neck having a neck opening; a first longitudinal side edge and an opposing second longitudinal side edge defining a container width therebetween; a cap positioned on the neck, the cap comprising a cap plate having an elongated opening comprising a front portion and an opposing back portion and a middle portion disposed therebetween, wherein the front portion comprises a front edge, the back portion comprises a back edge and a pair of opposing side edges extend between and join the front edge and the back edge, the elongated opening further comprising a width of from about 10 mm to about 35 mm, more preferably from about 13 mm to about 28 mm, or most preferably from about 13 mm to about 20 mm, wherein the back edge is spaced from the second longitudinal side edge by less than about 45 percent of the container width, more preferably less than about 43 percent of the container width or even more preferably less than about 41 percent of the container width; and wherein the liquid composition has a viscosity of from about 1 mPa·s to about 10,000 mPa·s, preferably from about 100 mPa·s to about 5,000 mPa·s, more preferably from 300 mPa·s to about 2,000 mPa·s, or most preferably from about 500 mPa·s to about 1,500 mPa·s.

Example A2: An array of containers each of which comprises a liquid composition, the array comprising: a first container having a first body portion and a first neck connected to the body portion, the first neck having a first neck wall thickness and a first neck opening having an inner diameter of from between about 18 mm to about 40 mm or from about 22 mm to about 40 mm, and wherein the first container has a first volume and is refillable; a second container having a second body portion; a second neck disposed on the second body portion, the second neck having a second neck opening; and a second volume that is greater than the first volume; and a cap joined to the second neck, the cap comprising a cap plate having an elongated opening comprising a width less than the inner diameter of the first container, the elongated opening further comprising a front portion and an opposing back portion and a middle portion disposed therebetween, wherein the front portion comprises a front edge and the back portion comprises a back edge; wherein the liquid composition the second container has a viscosity of from about 1 mPa·s to about 10,000 mPa·s, preferably from about 100 mPa·s to about 5,000 mPa·s, more preferably from 300 mPa·s to about 2,000 mPa·s, or most preferably from about 500 mPa·s to about 1,500 mPa·s; and wherein the first container and second container comprise the same brand name and/or are made by or on behalf of the same manufacturer.

Example A3: The container or array of any of Examples A1 and A2, further comprising a lid hingedly connected and unitary with the cap, wherein the lid in the closed position, sealingly engages the elongated opening.

Example A4: The container or array of any of Examples A1-A3, wherein the container further comprises a handle, and wherein the handle is more proximal to the second longitudinal side edge than the first longitudinal side edge.

Example A5: The container or array of any of Examples A1-A4, wherein the cap plate comprises a wall comprising a front wall portion and a back wall portion, wherein the back wall portion comprises a top back surface and wherein the top back surface is angled with respect to the cap plate.

Example A6: The container or array of Example A5, wherein the front wall portion comprises a top front surface and wherein the top front surface is angled with respect to the cap plate and wherein the angle of the top front surface is different than the angle of the top back surface.

Example A7: The container or array of any of Examples A1-A6, wherein a center point line extends through a center point of the neck opening, is vertically oriented, and bisects the length of the elongated opening.

Example A8: The container or array of Example A7, wherein the center point line is disposed within a width bisecting plane bisecting the container width wherein the width bisecting plane is vertically oriented.

Example A9: The container or array of any of Examples A1-A8, wherein the front edge is rounded.

Example A10: The container or array of any of Examples A1-A9, wherein the middle portion has a greater width than the front portion.

Example A11: The container of any of Examples A1-A10, wherein the body portion and/or neck comprises a polypropylene, a high-density polyethylene or a polyethyleneterephthalate material.

Example A12: The container or array of any of Examples A1-A11, wherein the cap comprises a high-density polyethylene, a low density polyethylene or a polypropylene.

Example A13: The container or array of any of Examples A1-A12, wherein the body portion and/or neck comprises recyclable material.

Example A14: The container or array of any of Examples A1-A13, wherein the body portion and/or neck comprises recycled material.

Example A15: The container of array of Example A14, wherein the container comprises at least about 20 wt %, preferably at least about 30 wt %, even more preferably at least about 50 wt %, even more preferably at least about 75 wt % and most preferably at least about 90 wt % post-consumer recycled content and/or post-industrial recycled content.

Example A16: The container or array of any of Examples A1-A15, wherein the elongated opening is in the shape of an oval.

Example B1: A cap removably attachable to a container comprising a liquid composition therein, the cap comprising: a cap plate having an elongated opening comprising a front portion, an opposing back portion and a middle portion disposed therebetween, wherein the front portion comprises a front edge, the back portion comprises a back edge and a pair of opposing side edges extend between and join the front edge and the back edge, the elongated opening further comprising a width of from about 10 mm to about 35 mm, more preferably from about 13 mm to about 28 mm, or most preferably from about 13 mm to about 20 mm.

Example B2: The cap of Example B1, wherein the middle portion has a greater width than the front portion.

Example B3: The cap of any of Examples B1 and B2, wherein the elongated opening has a length between the front edge and the back edge of at least about 22 mm, more preferably at least about 27 mm or even more preferably at least about 33 mm.

Example B4: The cap of any of Examples B1-B3, wherein the elongated opening has a length of from between about 22 mm to about 40 mm, more preferably from about 25 mm to about 36 mm or even more preferably from about 27 mm to about 33 mm.

Example B5: The cap of any of Examples B1-B4, wherein the cap plate comprises a wall comprising a front wall portion, wherein the front wall portion is proximal to the front edge, and wherein the front wall portion comprises a front surface disposed at a first angle with respect to the cap plate.

Example B6: The cap of Example B5, wherein the wall further comprises a back wall portion proximal to the back edge, and a middle portion disposed between the front wall portion and the back wall portion, and the back wall portion is proximal to the back edge, and wherein the front wall portion extends away from the cap plate to a larger extent than does the back wall portion.

Example B7: The cap of Example B6, wherein the middle wall portion extends away from the cap plate to a larger extent than does the back wall portion but to a lesser extent than does the front wall portion.

Example B8: The cap of any of Examples B5-B7, wherein the first angle of the front surface with respect to the cap plate is from between about 15 degrees to about 90 degrees, more preferably from about 30 degrees to about 80 degrees, or even more preferably from about 40 degrees to about 70 degrees.

Example B9: The cap of any of Examples B5-B8, wherein the front wall portion comprises a lip which extends outboard of the front surface away from the elongated opening.

Example B10: The cap of Example B9, wherein the lip is disposed at an angle with respect to the cap plate.

Example B11: The cap of any of Examples B5-B10, wherein the front surface comprises a first part and a second part, wherein the first part comprises the first angle and wherein the second part comprises a second angle that is different from the first angle and wherein the second part is more proximal to the cap plate than the first part.

Example B12: The cap of any of Examples B5-B11, wherein the front wall portion comprises a pair of side surfaces, wherein each of the side surfaces are disposed at a side angle with respect to the cap plate, and wherein the side angle is the same or less than the first angle.

Example B13: The cap of any of Examples B1-B12, wherein the cap is manufactured by or on behalf of a first manufacturer and is configured to be fitted on a container made by or on behalf of a second manufacturer that is different from the first manufacturer.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A container comprising a liquid composition therein, the container further comprising:
   a body portion;
   a neck disposed on the body portion, the neck having a neck opening;
   a first longitudinal side edge and an opposing second longitudinal side edge defining a container width therebetween;
   a cap positioned on the neck, the cap comprising a cap plate having an elongated opening comprising a front portion and an opposing back portion and a middle portion disposed therebetween, wherein the front portion comprises a front edge the back portion comprises a back edge, and a pair of opposing side edges extend between and join the front edge and the back edge, the elongated opening further comprising a width between opposing side edges of from about 10 mm to about 35 mm;
   wherein the back edge is more proximal to the second longitudinal side edge than the front edge, wherein the back edge is spaced from the second longitudinal side edge by less than about 45 percent of the container width; and
   wherein the liquid composition has a first viscosity of from about 1 mPa·s to about 10,000 mPa·s.

2. The container of claim 1, wherein the middle portion has a greater width than the front portion.

3. The container of claim 1, wherein the elongated opening has a length of from between about 22 mm to about 40 mm.

4. The container of claim 1, wherein the cap plate comprises a wall comprising a front wall portion, wherein the front wall portion is proximal to the front edge, and wherein the front wall portion comprises a front surface disposed at a first angle with respect to the cap plate.

5. The container of claim 4, wherein the wall further comprises a back wall portion proximal to the back edge, and a middle portion disposed between the front wall portion and the back wall portion, and wherein the front wall portion extends away from the cap plate to a larger extent than does the back wall portion.

6. The container of claim 5, wherein the middle wall portion extends away from the cap plate to a larger extent than does the back wall portion but to a lesser extent than does the front wall portion.

7. The container of claim 4, wherein the front portion comprises a first part having an inner surface disposed at a first angle with respect to a vertical reference line, wherein the first angle is from between about 10 degrees to about 80 degrees from the from the vertical reference line.

8. The container of claim 7, wherein the front wall portion comprises a lip which extends outboard of the front surface away from the elongated opening.

9. The container of claim 8, wherein the lip is disposed at an angle with respect to the cap plate.

10. The container of claim 4, wherein the front surface comprises a first part and a second part, wherein the first part comprises the first angle and wherein the second part comprises a second angle that is different from the first angle and wherein the second part is more proximal to the cap plate than the first part.

11. The container of claim 4 wherein the front wall portion comprises a pair of side surfaces, wherein each of the side surfaces are disposed at a side angle with respect to the cap plate, and wherein the side angle is the same or less than the first angle.

12. The container of claim 1, wherein the liquid composition is disposed in an internal volume, and wherein the neck is disposed on the body portion such that in a refill position and when the internal volume is full, at least 20 percent by volume of the liquid composition is dispensed.

13. The container of claim 1, wherein the cap further comprises a lid hingedly connected thereto and capable of sealingly engaging the elongated opening.

14. The container of claim 1, wherein the width between opposing side edges is from between about 13 mm to about 28 mm.

15. The container of claim 1, wherein the length of the elongated opening is from between about 25 mm to about 36 mm.

16. The container of claim 4, wherein the front portion comprises a first part having an inner surface disposed at a first angle with respect to a vertical reference line, wherein the first angle is from between about 20 degrees to about 70 degrees from the from the vertical reference line.

17. An array of containers each of which comprises a liquid composition, the array comprising:
- a first container claim 1, wherein the first container has a first volume;
- a second container having a second body portion and a second neck connected to the second body portion, the second neck having a second neck wall thickness and a second neck opening having an inner diameter of from between about 18 mm to about 40 mm, and
- wherein the width of the elongated opening of the first container is less than the inner diameter of the second neck opening of the second container, and
- wherein the second container is refillable and has a second volume that is less than the first volume,
- wherein the liquid composition in the second container has a second viscosity substantially equal to the first viscosity,
- wherein the first container and second container comprise the same brand name and/or are made by or on behalf of the same manufacturer.

18. The array of claim 17, wherein the front wall portion comprises a height, and wherein the height is preferably less than 50 percent of the inner diameter of the second neck opening.

19. The array of claim 17, wherein the front wall portion height is equal to or greater than the second neck wall thickness.

20. The array of claim 19, wherein the front wall height is at least 3 mm.

* * * * *